(12) United States Patent
Mettler et al.

(10) Patent No.: US 12,522,991 B2
(45) Date of Patent: Jan. 13, 2026

(54) PORTABLE COLLAPSIBLE BARRICADE

(71) Applicant: Plastic Safety Systems, Inc., Cleveland, OH (US)

(72) Inventors: Charles M. Mettler, Perry, OH (US); Gregory H. Brown, Chagrin Falls, OH (US); Stephen A. Speaker, Fairview Park, OH (US); Edgardo Santiago-Diaz, Mary Esther, FL (US)

(73) Assignee: Plastic Safety Systems, Inc., Cleveland, OH (US)

( * ) Notice: Subject to any disclaimer, the term of this patent is extended or adjusted under 35 U.S.C. 154(b) by 0 days.

(21) Appl. No.: 17/428,702

(22) PCT Filed: Feb. 7, 2020

(86) PCT No.: PCT/US2020/017173
§ 371 (c)(1),
(2) Date: Aug. 5, 2021

(87) PCT Pub. No.: WO2020/163691
PCT Pub. Date: Aug. 13, 2020

(65) Prior Publication Data
US 2022/0002956 A1   Jan. 6, 2022

Related U.S. Application Data

(60) Provisional application No. 62/803,481, filed on Feb. 9, 2019.

(51) Int. Cl.
*E01F 9/654* (2016.01)
*E01F 9/688* (2016.01)
*G09F 15/00* (2006.01)

(52) U.S. Cl.
CPC .............. *E01F 9/654* (2016.02); *E01F 9/688* (2016.02); *G09F 15/0062* (2013.01)

(58) Field of Classification Search
CPC ........ E01F 9/654; E01F 9/688; G09F 15/0062
See application file for complete search history.

(56) References Cited

U.S. PATENT DOCUMENTS

| 118,478 | A | * | 8/1871 | Parker | A47F 5/13 |
| | | | | | 415/24 |
| 911,770 | A | * | 2/1909 | Shively | F16M 11/20 |
| | | | | | 248/166 |

(Continued)

FOREIGN PATENT DOCUMENTS

| GB | 312102 A | * 5/1929 |
| GB | 373374 A | 5/1932 |

(Continued)

OTHER PUBLICATIONS

International Search Report and Written Opinion issued Apr. 17, 2020, for International Patent Application No. PCT/US2020/017173.

*Primary Examiner* — Kristina M Deherrera
*Assistant Examiner* — Tania Courson
(74) *Attorney, Agent, or Firm* — Renner, Otto, Boisselle & Sklar, LLP

(57) ABSTRACT

A portable barricade includes at least three legs that are operably coupled together to permit movement relative to each other between a collapsed state and an expanded state. The barricade is configured such that when in the collapsed state, the at least three legs are arranged with at least one of the legs stacked between at least two other legs to form a compact stack that facilitates portability of the barricade. The at least three legs are operably coupled together for rotation about a common axis. When the barricade is deployed to the expanded state, each leg is rotated about the common axis to spread the legs apart such that each leg is arranged at a different angular position about the axis (Continued)

relative to the other legs, thereby enlarging the footprint and/or enhancing stability of the barricade.

18 Claims, 16 Drawing Sheets

(56) References Cited

U.S. PATENT DOCUMENTS

| | | | | |
|---|---|---|---|---|
| 965,194 | A * | 7/1910 | Karbiner | F16M 11/22 211/1 |
| 1,863,756 | A * | 6/1932 | Lufkin | E01F 9/654 116/63 P |
| 1,931,584 | A * | 10/1933 | Luff | A47J 36/34 248/167 |
| 2,483,734 | A * | 10/1949 | Neal | E01F 9/612 116/63 P |
| 2,806,670 | A * | 9/1957 | Straster | B60Q 7/005 116/63 P |
| 3,475,109 | A * | 10/1969 | Sayles | F42B 4/20 431/345 |
| D220,408 | S * | 4/1971 | Nygaard | D10/113.3 |
| 3,911,854 | A * | 10/1975 | Manuel | A63B 71/00 116/63 P |
| 4,085,762 | A * | 4/1978 | O'Brian | E04H 15/006 312/258 |
| 4,203,242 | A * | 5/1980 | Griffin | F16M 11/10 248/168 |
| 4,462,145 | A | 7/1984 | Schulze | |
| 5,287,822 | A * | 2/1994 | Anderson | E01F 9/654 116/63 P |
| 5,358,762 | A * | 10/1994 | McGrath | G09F 15/0062 40/610 |
| 5,371,964 | A * | 12/1994 | Kubacki | G09F 15/0062 16/234 |
| D357,432 | S * | 4/1995 | Snodgrass | D11/118 |
| 5,746,406 | A * | 5/1998 | Dicke | F16M 11/16 248/513 |
| 5,993,103 | A * | 11/1999 | Christensen | E01F 9/70 116/63 P |
| 6,149,339 | A * | 11/2000 | Salloum | E01F 9/654 116/63 P |
| 6,505,429 | B2 * | 1/2003 | Percival | F41A 23/12 248/164 |
| 6,572,061 | B2 * | 6/2003 | Overbeck | A47C 7/008 248/163.1 |
| 6,681,715 | B2 * | 1/2004 | Wood | E01F 9/688 116/63 P |
| 6,857,385 | B1 * | 2/2005 | Chen | B60Q 7/00 116/63 P |
| 6,971,329 | B1 * | 12/2005 | Stewart | E01F 9/654 116/63 P |
| D514,009 | S * | 1/2006 | Parr | D10/113.2 |
| 7,047,681 | B2 * | 5/2006 | Perelli | E01F 9/654 116/63 P |
| D583,269 | S * | 12/2008 | Huang | D10/113.4 |
| 7,536,973 | B2 | 5/2009 | Mettler et al. | |
| 7,823,857 | B2 * | 11/2010 | Stengel | A47B 97/08 248/463 |
| D665,689 | S * | 8/2012 | Mettler | D10/113.3 |
| 9,228,695 | B2 * | 1/2016 | Cyr | F16M 11/36 |
| 9,314,652 | B2 * | 4/2016 | Broadley | F16M 11/26 |
| 9,485,961 | B2 * | 11/2016 | Briski | A01K 5/0114 |
| 10,706,752 | B2 * | 7/2020 | Greenfield | E01F 9/688 |
| 10,863,810 | B1 * | 12/2020 | Baccellieri | F41A 23/14 |
| 10,870,956 | B1 * | 12/2020 | Merriam | E01F 13/02 |
| 12,030,202 | B2 * | 7/2024 | Gratsias | B26B 21/52 |
| 2007/0107286 | A1 * | 5/2007 | Jedlicka | G09F 15/0062 40/610 |
| 2009/0022547 | A1 * | 1/2009 | Lo | E01F 9/654 404/9 |
| 2009/0084306 | A1 | 4/2009 | Noonan, II | |
| 2009/0308304 | A1 | 12/2009 | Ho | |
| 2015/0030390 | A1 * | 1/2015 | Brown | E01F 9/529 404/15 |
| 2017/0307131 | A1 * | 10/2017 | Brunner | B25H 1/06 |

FOREIGN PATENT DOCUMENTS

| | | | | |
|---|---|---|---|---|
| KR | 20030019479 A | | 3/2003 | |
| WO | WO-2015168882 A1 | * | 11/2015 | E01F 9/619 |
| ZA | 200006396 B | | 11/2001 | |

* cited by examiner

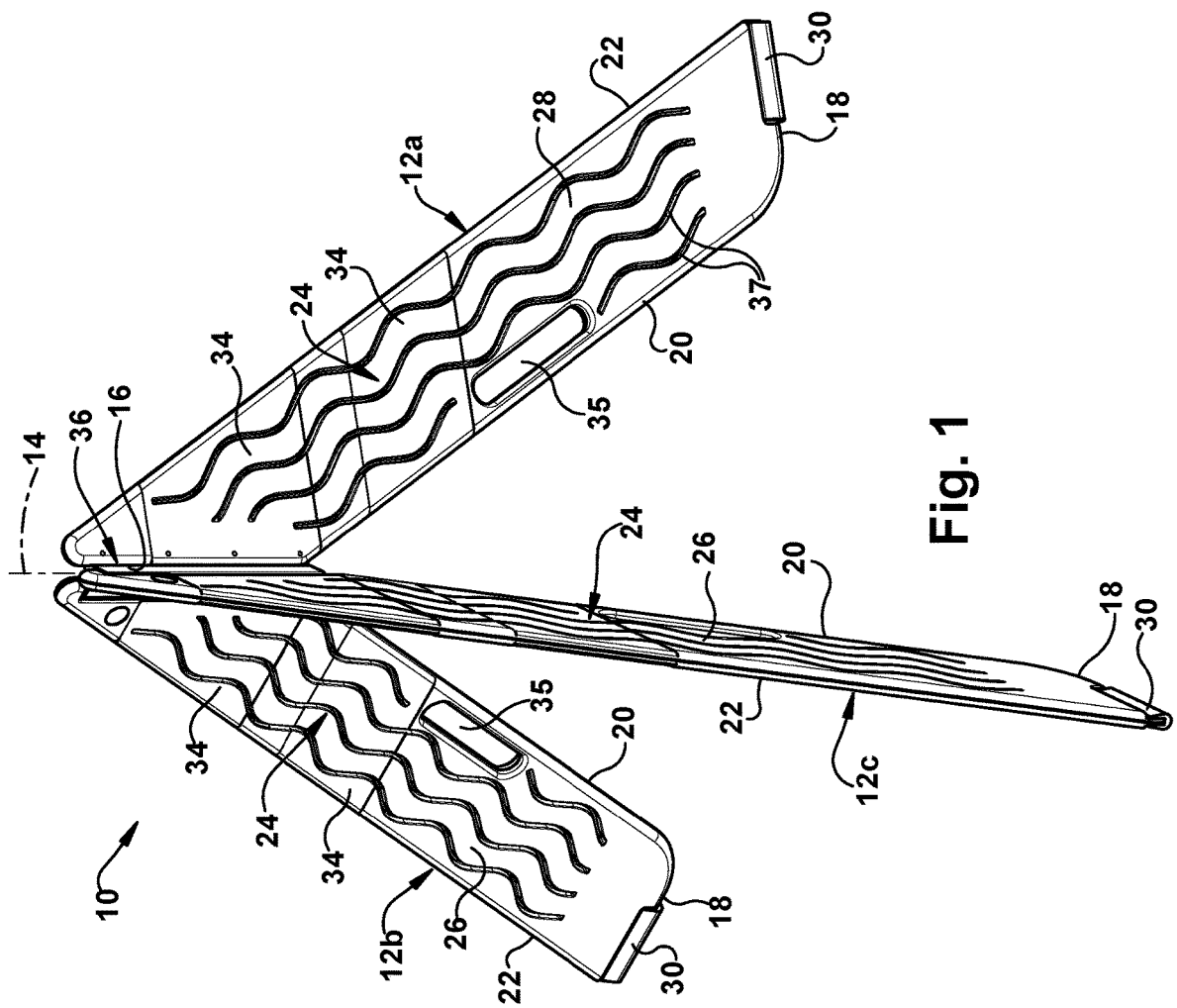

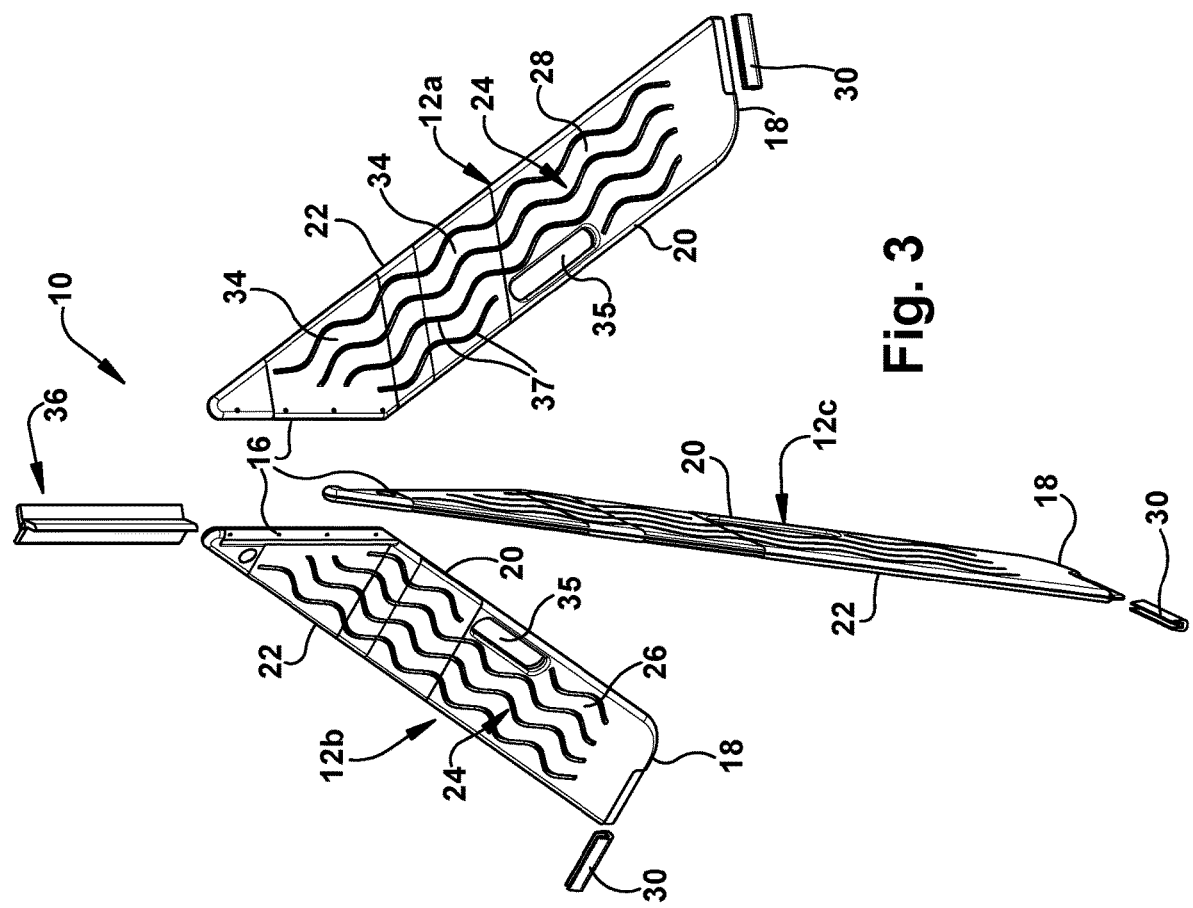
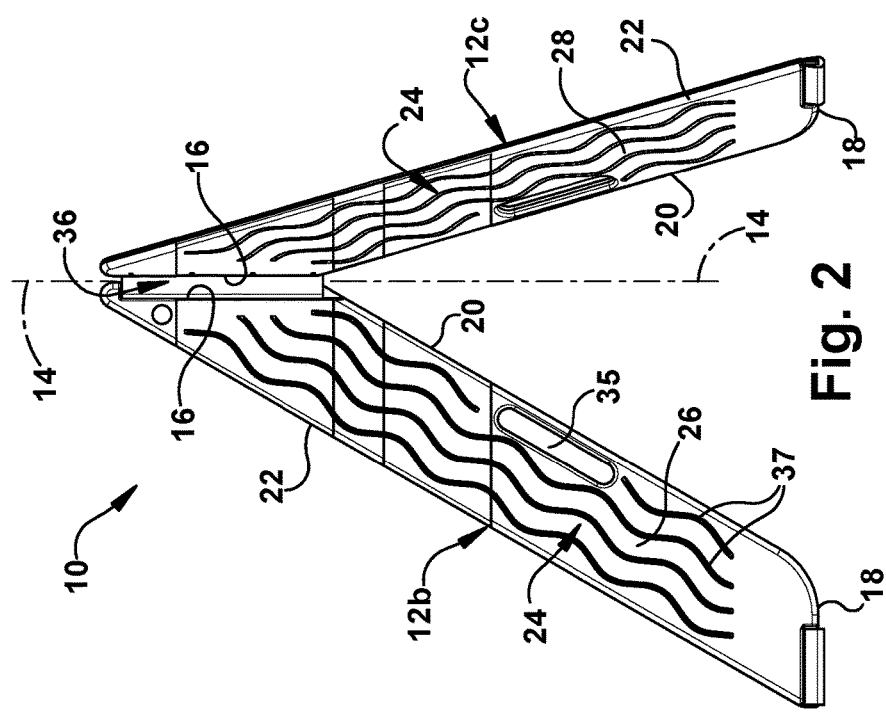

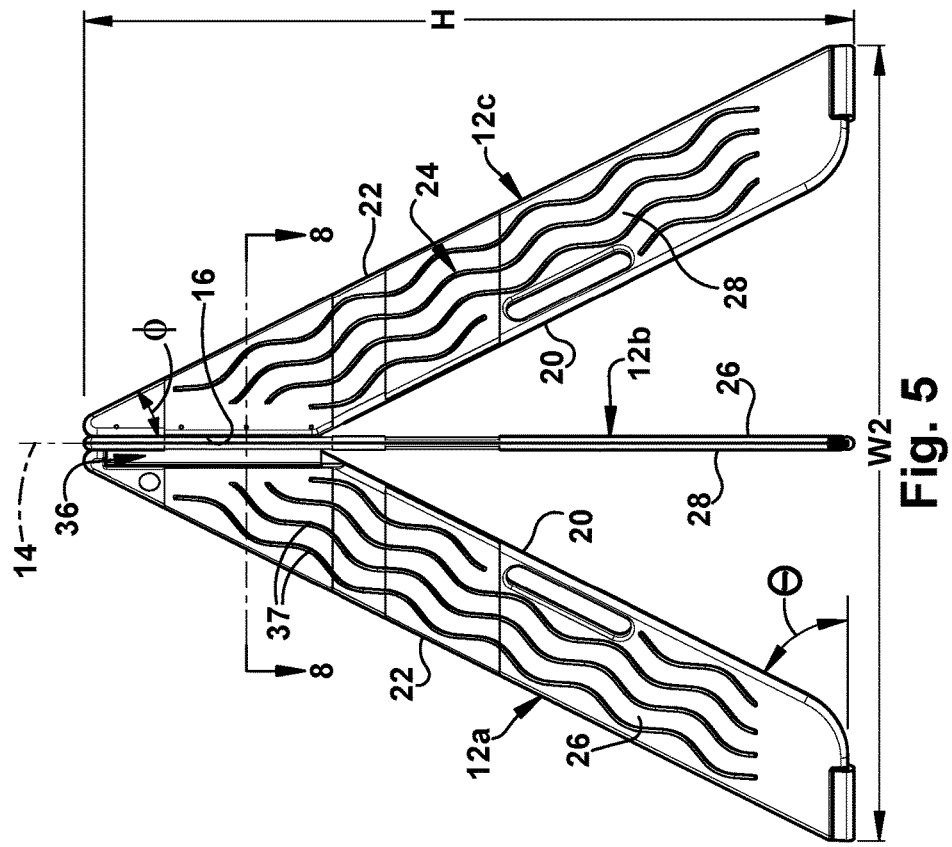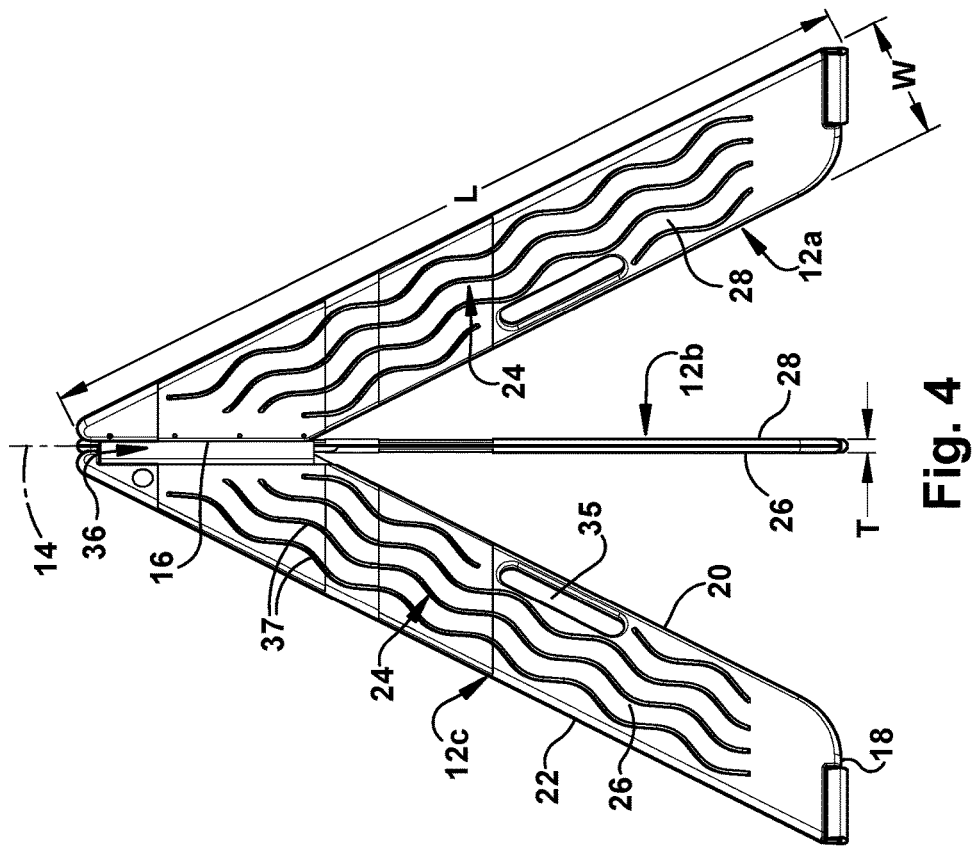

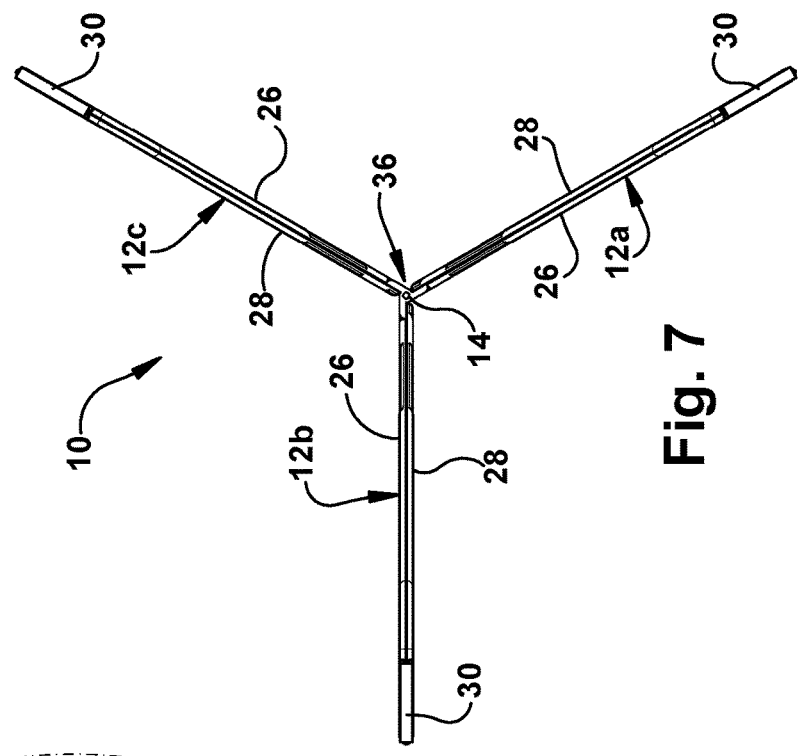
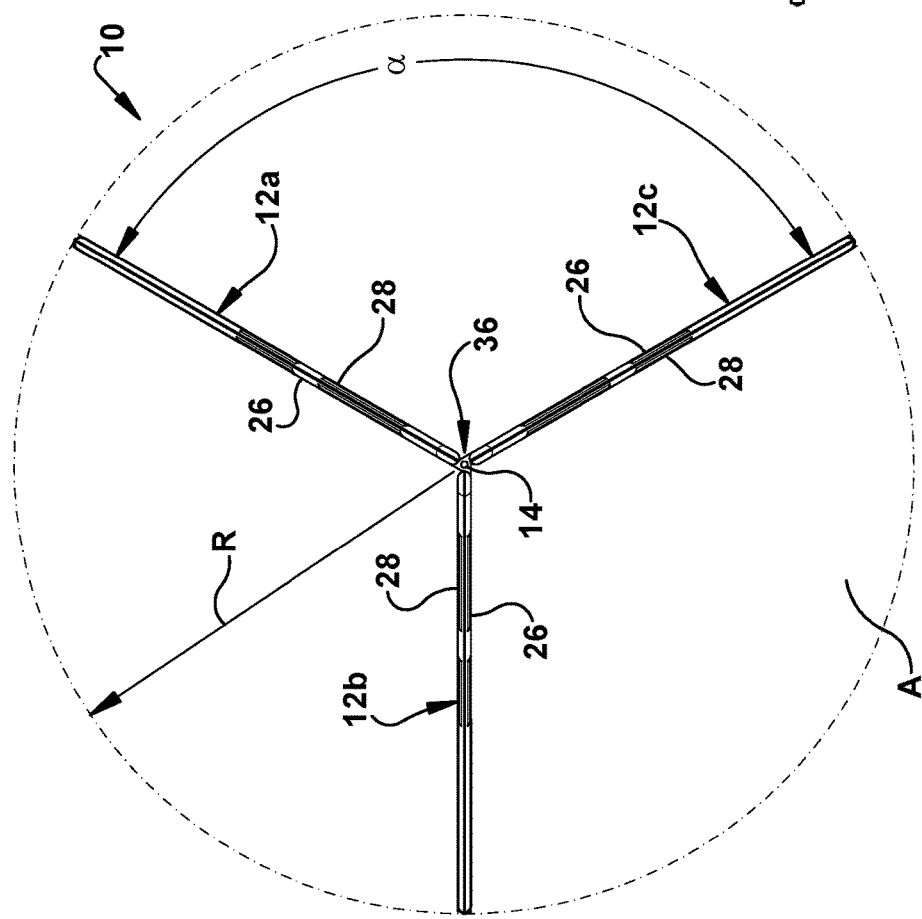

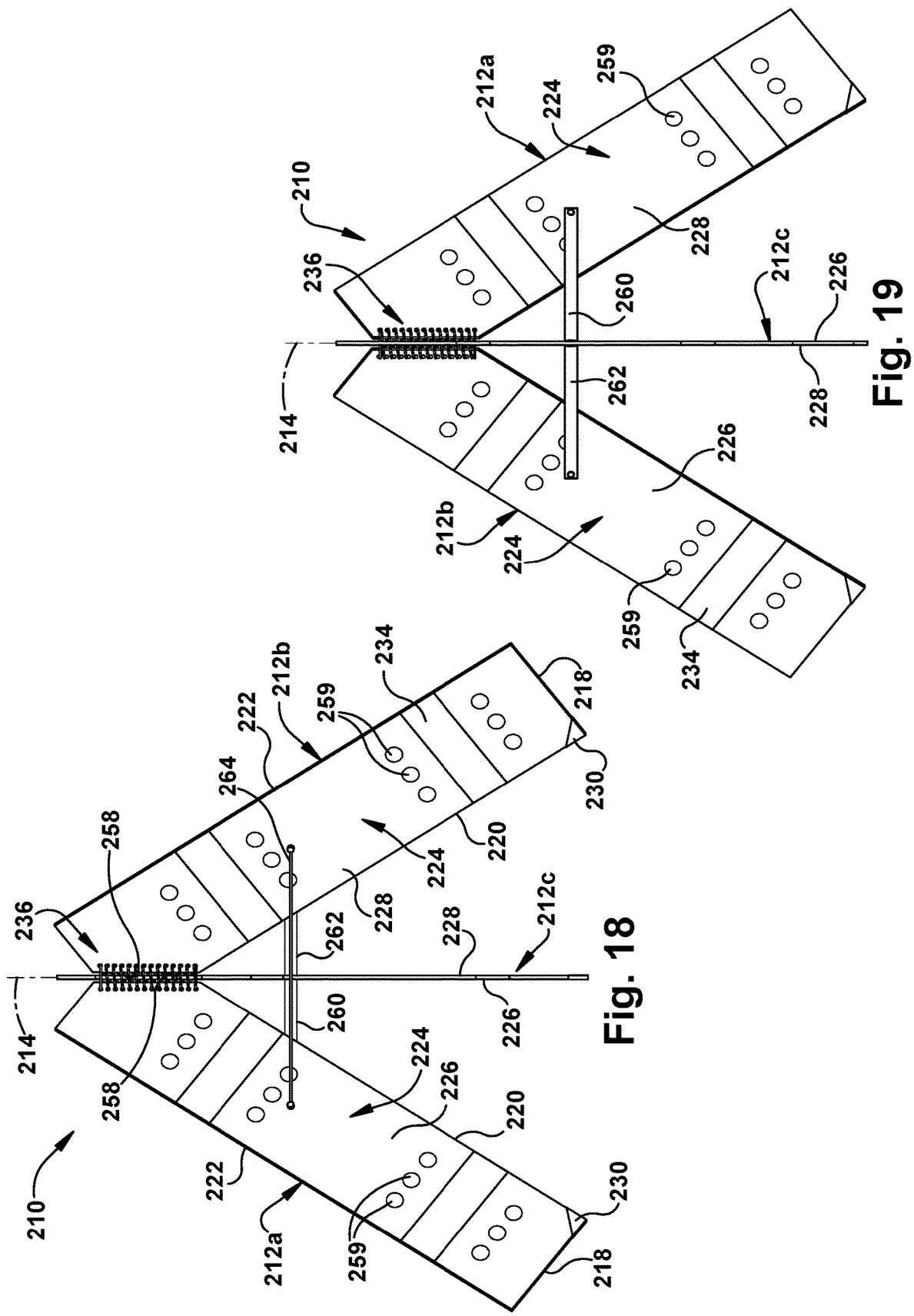

PORTABLE COLLAPSIBLE BARRICADE

RELATED APPLICATIONS

This application is a national phase of International Application No. PCT/US2020/017173 filed Feb. 7, 2020, which claims priority to U.S. Provisional Application No. 62/803,481 filed Feb. 9, 2019, which are hereby incorporated herein by reference in their entirety.

TECHNICAL FIELD

The present invention relates generally to barricades, and more particularly to a portable barricade that is collapsible for ease of transportation, and expandable for deploying at the point of use.

BACKGROUND

Barricades are structures that create a barrier or obstacle to control, block passage, or force the flow of traffic in a desired direction. For example, traffic barricades may be used by first responders, such as police officers, firemen, or other emergency personnel, to direct traffic away from an accident or other hazard to keep those involved away from harm. A typical barricade that is carried in the vehicle of such first responders is a traffic cone.

SUMMARY

Although traffic cones are relatively compact, inexpensive, and easily portable, one problem first responders face is that traffic cones have a relatively small footprint, which allows vehicles or pedestrians to easily circumvent the barricade defined by such cones. Other forms of barricades with larger footprints may be used, such as barrels or sawhorses, but these larger barricades are bulky, heavy, and are not practically capable of being carried in a first responder's vehicle. As a result, first responders often must wait for local traffic control or maintenance departments to setup these larger barricades. This takes valuable time, especially when the accident or other hazard is still presenting a threat to those involved.

An aspect according to the present disclosure provides a portable barricade that is easily collapsible into a compact stack for facilitating transportation to a point of use, and which is also expandable at the point of use to increase the footprint of the barricade for enhancing its obstructive capabilities and visibility.

Generally, the portable barricade may be light-weight, compact and portable enough such that it may be carried by first responders, civilians, commercial businesses, and the like for immediate deployment at the point of use, without the need to wait for city department work crews to arrive.

More particularly, according to an aspect of the present disclosure, a portable barricade includes: at least three legs configured for placement on the ground, the at least three legs being operably coupled together to permit movement relative to each other between a collapsed state and an expanded state, wherein the barricade is configured such that: when in the collapsed state, the at least three legs are arranged with at least one of the legs stacked between at least two others of the legs to form a compact stack that facilitates portability of the barricade; and when in the expanded state, the at least three legs are deployed such that respective portions of the at least three legs are spread outwardly away from each other to enlarge the footprint of the barricade when placed on the ground.

According to another aspect of the present disclosure, a portable barricade for placement on the ground includes: at least three legs, each leg having a top portion, a bottom portion, and a side portion that extends between the top portion and the bottom portion; at least one hinge that hingedly couples the at least three legs together for permitting movement of the legs relative to each other about a common axis between a collapsed state and an expanded state; where in the collapsed state the barricade is configured such that the at least three legs are stacked adjacently to one another to form a compact stack for facilitating portability; and where in the expanded state the barricade is configured such that each of the three legs is rotated about the common axis such that each leg is arranged at a different angular position about the common axis relative to each other leg.

According to another aspect of the present disclosure, a kit is provided including a plurality of portable barriers in accordance with one or more aspects of the present disclosure, and a container for carrying the plurality of barriers.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 1 is an isometric top, rear view of an exemplary portable barricade according to an embodiment of the present disclosure, in which the barricade is shown in an exemplary expanded state.

FIG. 2 is a side view of the barricade shown in the expanded state.

FIG. 3 is an exploded isometric view of the barricade.

FIG. 4 is a front view of the barricade shown in the expanded state.

FIG. 5 is a rear view of the barricade shown in the expanded state.

FIG. 6 is a top view of the barricade shown in the expanded state.

FIG. 7 is a bottom view of the barricade shown in the expanded state.

FIG. 18 is a front view of the barricade in FIG. 17 shown in the expanded state.

FIG. 19 is a rear view of the barricade in FIG. 17 shown in the expanded state.

DETAILED DESCRIPTION

Figure 8:
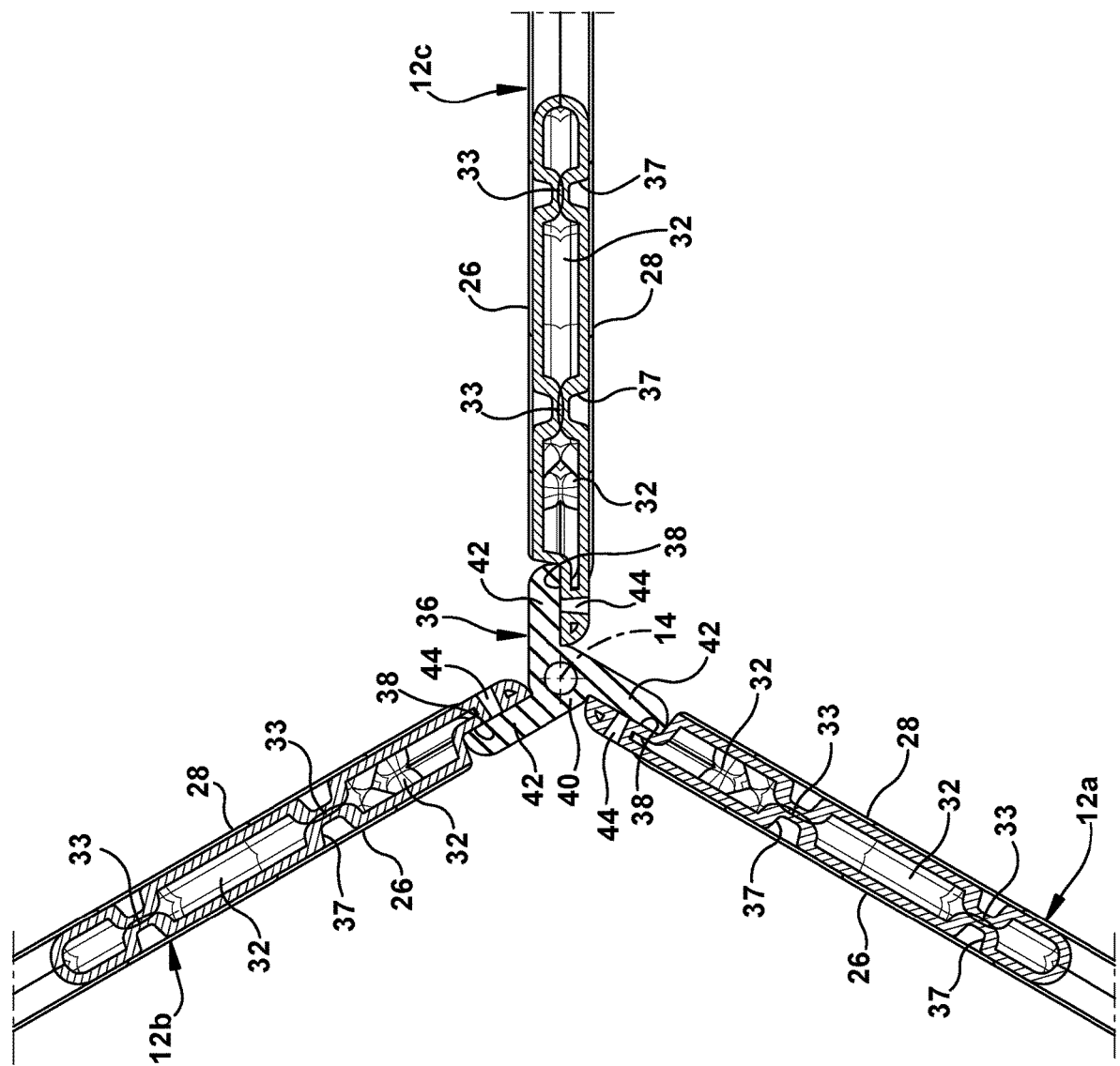
FIG. 8 is an enlarged cross-sectional view of the barricade taken about the line 8-8 in FIG. 5.

The principles and aspects of the present invention may have particular application to traffic barricades for use on roads or pedestrian walkways, and thus will be described below chiefly in this context. The principles and aspects of the present invention, however, may be applicable in other applications, or to other barricade structures that generally create an obstacle to control the flow of objects travelling in a desired direction, particularly where it may be desirable to provide a device that is easily transportable to a desired point of use, and which is also deployable at the point of use to enhance the obstructive functionality of the device.

Referring initially to FIGS. 1-11, an exemplary embodiment of a portable barricade 10 is shown. Generally, the barricade 10 includes at least three legs 12a, 12b, 12c that are configured to support the barricade 10 for placement on the ground. The at least three legs (collectively referred to with reference numeral 12) are operably coupled together to permit movement relative to each other between a collapsed state (FIGS. 9-11) for facilitating portability, and an expanded state (FIGS. 1 and 2-8) for enhancing the footprint and/or stability of the barricade structure when placed on the ground. More particularly, as described in further detail below, the barricade 10 is configured such that when in the collapsed state, the at least three legs 12 are arranged with at least one of the legs (e.g., 12c) stacked between at least two others of the legs (e.g., 12a, 12b) to form a compact stack that facilitates portability of the barricade 10. When the barricade 10 is deployed to the expanded state, the at least three legs 12 are unstacked from each other such that respective portions of the at least three legs 12 are spread outwardly away from each other to enlarge the footprint and/or enhance stability of the barricade 10. More specifically, when the barricade 10 is deployed to the expanded state, each leg 12 can be rotated about a common axis 14 such that each leg is arranged at a different angular position about the axis relative to the other legs 12.

The legs 12 may have any suitable shape and/or may be made of any suitable material for supporting the barricade structure 10 when deployed and placed upright on the ground (as shown in FIGS. 1 and 2-8, for example). In exemplary embodiments, each of the legs 12 may be formed as panels having respective top edges 16, bottom edges 18, inside edges 20, and outside edges 22, in which the opposite inside and outside side edges 20, 22 extend in a longitudinal direction between the top and bottom edges 16, 18. The legs 12 also include respective side portions 24 having a first face 26 and an opposite second face 28 that extend between the top 16, bottom 18, inside 20, and outside edges 22. As shown, each of the legs 12 has a maximum length, L, between the top and bottom edges 16, 18; a maximum width, W, between the inside and outside edges 20, 22; and a maximum thickness, T, between the first and second faces 26, 28 of the side portion 24. In exemplary embodiments, the legs 12 may be configured as elongated panels, in which the length L of each leg 12 is greater than its width W, and the width W of each leg 12 is greater than its thickness T. Generally, the barricade 10 may be configured such that the bottom edges 18 or bottom portions are configured for placement on the ground, and the relatively wide side portions 24 are configured to face outwardly when viewed from the side to enhance the visible characteristics of the barricade 10. As shown, each leg may have a footing 30, such as a durable rubber or metal shoe, that is disposed at the bottom edge 18 for enhancing the grip of the barricade 10 on the ground.

In the illustrated embodiment, the legs 12 have a generally trapezoidal perimeter formed by the respective edges 16, 18, 20, 22. In this manner, when the barricade 10 is in its expanded state and the bottom edge 18 engages the ground, the inside edge 20 and the outside edge 22 are each inclined at an acute inner angle, Θ, relative to the ground. The acute angle Θ of the inside and outside edges 20, 22 relative to the ground are the same in the illustrated embodiment, however, the angles could be different. As shown, such a configuration of the barricade 10 forms an internal space between the respective inside edges 20 of the legs 12, which may allow for wind to pass therethrough for enhancing the stability of the structure. Such a configuration of the legs 12 also may help to minimize the weight of the barricade 10 by reducing the amount of material used for each side portion 24, while also providing a sufficiently stable enough structure for placement on the ground. Alternatively or additionally, the side portions 24 of the legs 12 may include one or more through-holes that allow wind to pass therethrough to minimize wind resistance and enhance stability.

Although shown as being formed in a generally trapezoidal shape, the legs 12 may take other suitable shapes or forms, including other polygonal, quadrilateral or parallelogram shapes; round shapes; triangular shapes; or irregular shapes. For example, in some embodiments, each leg 12 may have a triangular form, in which the inside edge 20 would be perpendicular to the bottom edge 18 and the ground, and the outside edge 22 would be inclined relative to the bottom edge 18, the inside edge 20 and the ground. Such a triangular configuration would increase the surface area of the side portion 24, which would enhance the visible characteristic of the barricade 10; however, this configuration also may add weight and increase wind resistance. As shown in the illustrated embodiment, each leg 12 may have an identical shape, which may minimize the number of different parts to facilitate manufacturing and reduce costs. However, the legs 12 may have different shapes from each other, as will be discussed below in connection with other exemplary embodiments.

In exemplary embodiments, the legs 12 are made from plastic, such as polyethylene or polypropylene. The plastic legs 12 may be formed via any suitable process, such as blow molding, rotational molding, or injection molding, for example. As shown in FIG. 8, for example, the plastic legs 12 may have hollow portions 32, optionally with webbing 33 between the opposite faces 26, 28 of the side portion 24. Such hollow panels may further minimize the weight of the barricade 10 to enhance its portability. In the illustrated embodiment, the legs 12 are formed with the webbing 33 in a wave pattern, which may enhance the flexural strength of the legs 12 in multiple directions. The wave-shaped webbing 33 is shown on the faces 26, 28 of the side portions 24 as wave-shaped surface grooves 37. Such a configuration of such hollow plastic panels with wave-patterned webbing is described in U.S. Pat. No. 7,536,973, which is incorporated herein by reference in its entirety. Although legs 12 may be made entirely of plastic, the legs 12 may be made from or include other suitable materials or combinations of materials, such as composites (e.g., fiber reinforced plastics) for enhancing the strength-to-weight ratio of the legs; suitable metals (e.g., iron slugs or rods) for enhancing the strength of the legs and/or for adding weight to enhance the stability of the barricade 10; and/or other suitable materials such as wood, foams, and the like.

As shown, the barricade 10 may include one or more reflective materials 34 or other features that promote its visibility. For example, in the illustrated embodiment, the barricade 10 includes two strips of reflective material 34 on each leg, particularly on the side portions 24 and/or the outside edges 22. Two separate types of reflective material, such as alternating orange and white, could be used in combination on each of the barricade legs 12. This results in a three-dimensional, highly visible portable barricade 10. Alternatively or additionally, the barricade 10 may include a light (not shown). The light may be powered by an onboard battery, or by solar power via an onboard solar panel. As shown, the legs 12 may each have respective handle holes 35, which may align with each other in the collapsed state, to further enhance the portability of the barricade design.

Figure 9:
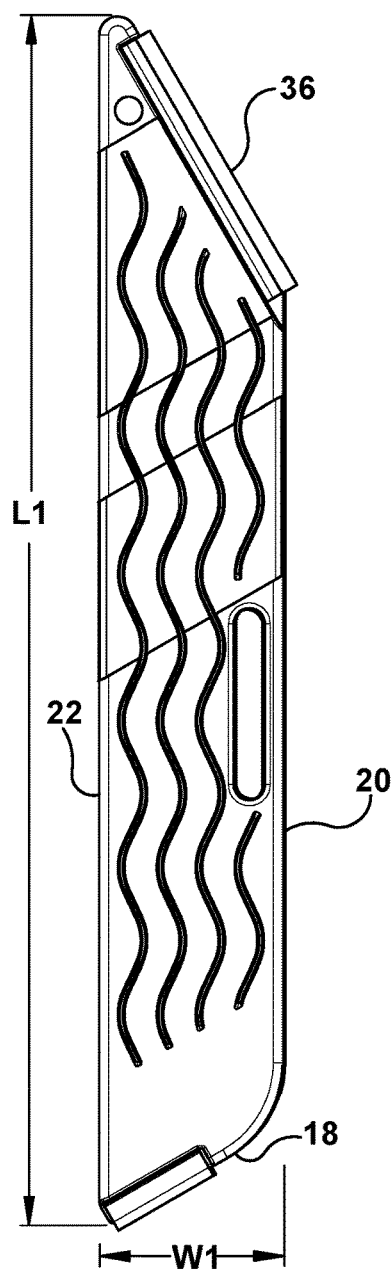
FIG. 9 is a side view of the barricade in FIG. 1 shown in an exemplary collapsed state.
Figure 10:
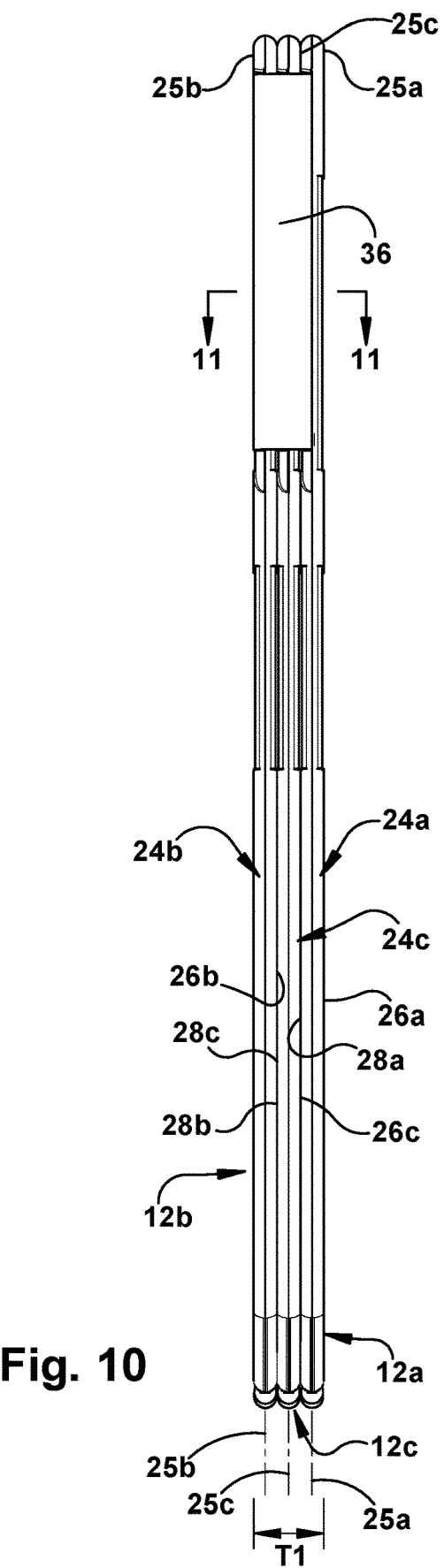
FIG. 10 is a front view of the barricade shown in the collapsed state.
Figure 11:
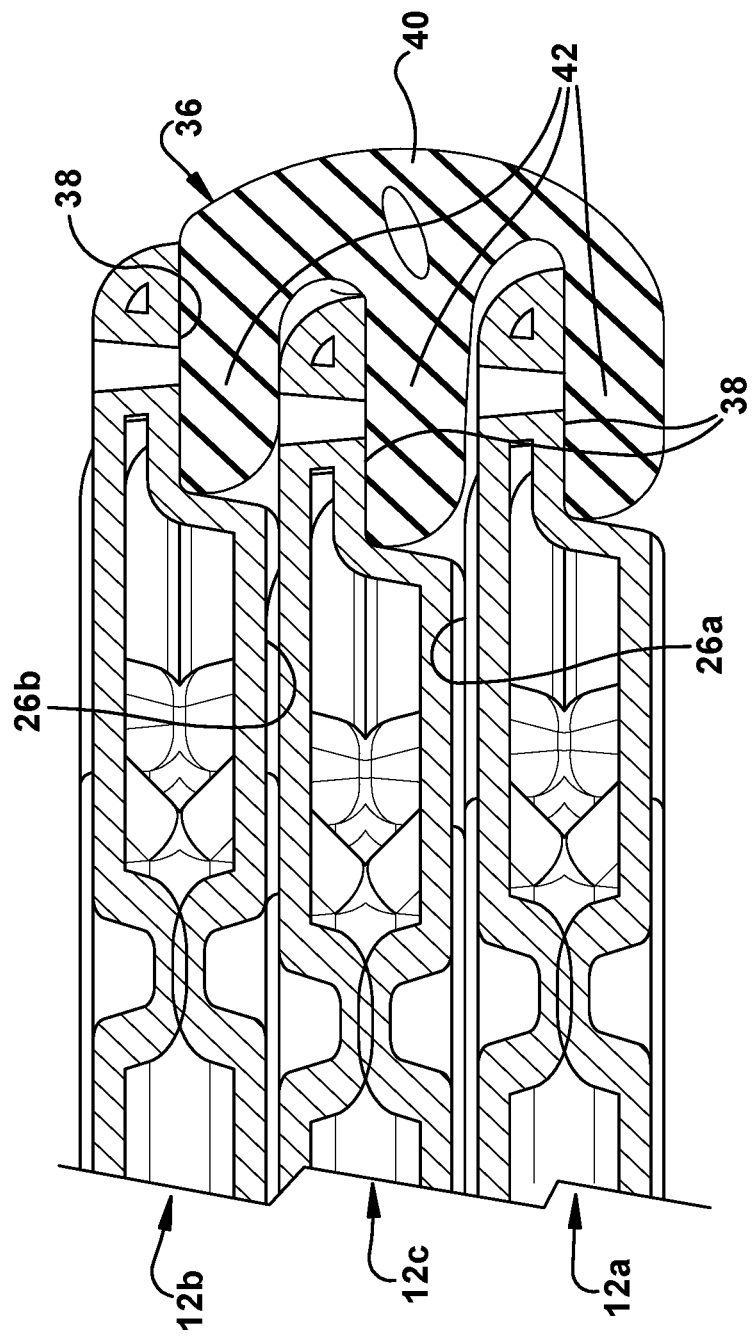
FIG. 11 is an enlarged cross-sectional side view of the barricade taken about the line 11-11 in FIG. 10.

Referring particularly to FIGS. 9-11, the barricade 10 is shown in its exemplary collapsed state. As shown in the illustrated embodiment, the respective side portions 24 may be stacked adjacently to one another such that the side portion 24c of the third leg 12c is sandwiched between the side portions 24a, 24b of the first and second legs 12a, 12b. As shown, the at least three legs 12a, 12b, 12c may be stacked adjacently such that the respective side portions 24a, 24b, 24c extend along respective longitudinal axes 25a, 25b, 25c that are parallel to each other. The legs 12 may be directly adjacent to each other, or may be indirectly adjacent to each other (e.g., with one or more structures interposed between the legs 12). In the illustrated embodiment, the third leg 12c is shown stacked in the middle between the other two legs 12a, 12b; however, in this embodiment any of the legs 12a, 12b, or 12c could be the middle leg in the collapsed state. In the illustrated embodiment, the barricade 10 is shown with only three legs, however, more than three legs, such as four, five, six or more legs could be provided, in which case the first and second outside legs would sandwich the remaining inside legs stacked therebetween when in the collapsed state. Only three legs may be preferred, however, to minimize complexity, size and weight, while also providing adequate stability to the barricade 10.

Figure 25:
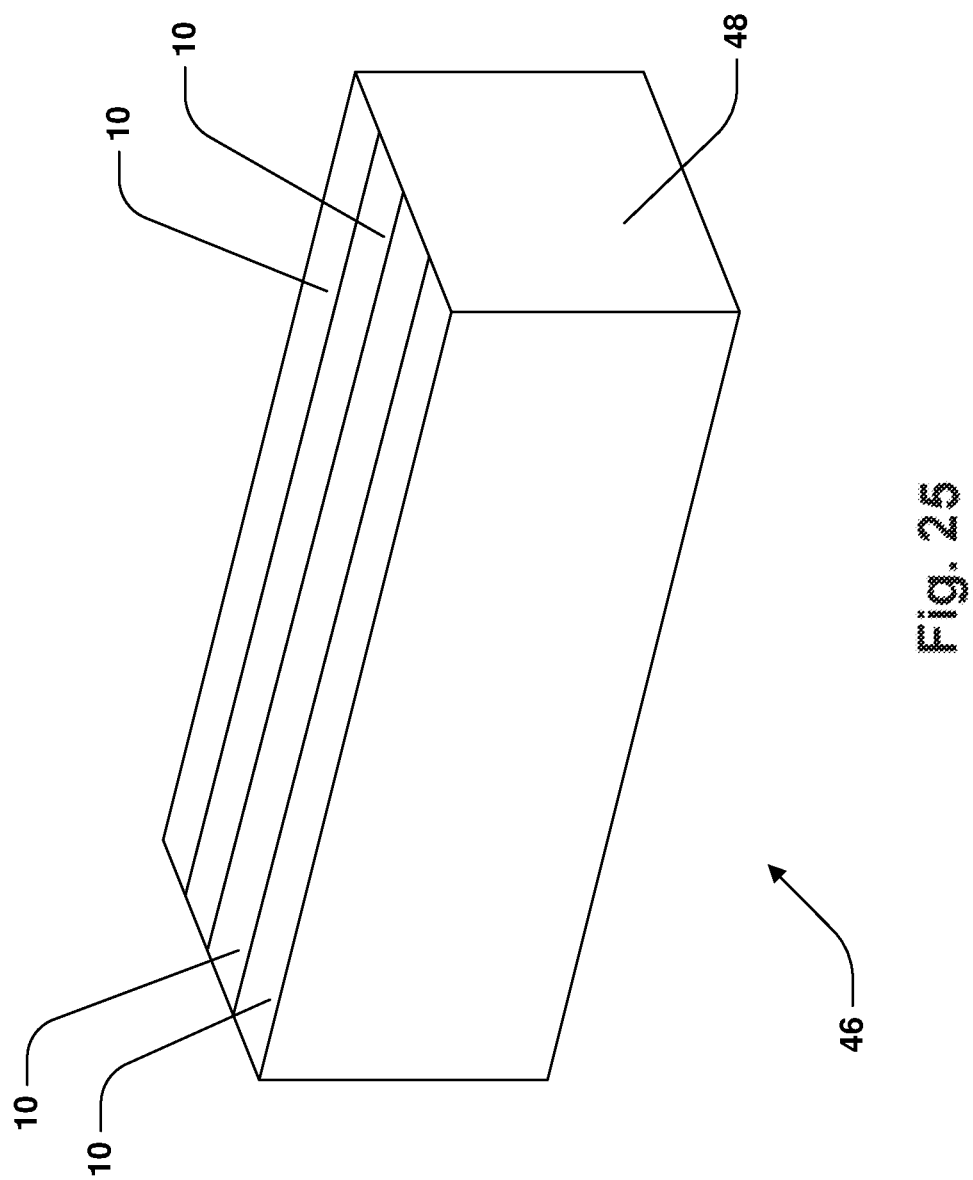
FIG. 25 is a schematic representation of a plurality of barricades within a container.

As best illustrated in FIG. 10, the respective first faces 26a, 26b, 26c and second faces 28a, 28b, 28c of the respective side portions 24a, 24b, 24c may be flat surfaces that are configured to mate with each other along the length of the leg 12 when in the collapsed state. In this manner, when in the collapsed state, the flat surfaces of each face 26, 28 are essentially parallel with each other. The flat surfaces of each face 26, 28 may include surface features, such as surface grooves 37 (as shown), or the flat surfaces may be devoid of such surface features. Also as shown best in FIG. 9, when in the collapsed state the respective top 16, bottom 18, and side edges 20, 22 all essentially align with each other. Such a configuration enhances the compactness of the design when in the collapsed state. For example, in an exemplary (non-limiting) embodiment, the barricade 10 in the collapsed state may measure about 33 inches (about 84 cm) in maximum length, L1, about 5 inches (about 13 cm) in maximum width, W1, and about 1.5 inches (about 4 cm) in maximum thickness, T1, with each leg being about 0.5 inches (about 1.3 cm) thick. The estimated weight of the barricade 10 having the hollow wave-formed plastic panels for each leg is about 3.0 to 4.0 pounds (about 1.4 to 1.8 kg). Accordingly, such a barricade 10 may be provided with other barricades 10 in a bundle or kit 46, such as with two, three or more such barricades 10 that are provided in a bag or other enclosure 48 for carrying in a first responder's vehicle as shown schematically in FIG. 25.

Referring particularly to FIGS. 1, 2 and 4-8, the barricade 10 is shown in its exemplary expanded state. As described above, the at least three legs 12 are operably coupled together for rotation about a common axis 14, and when the barricade 10 is deployed to the expanded state, the legs 12 are rotated about the common axis 14 such that each leg 12a, 12b, 12c is arranged at a different angular position about the axis 14 relative to the other legs 12a, 12b, 12c.

In exemplary embodiments, the respective bottom edges 18 or bottom portions of the legs 12 are spread outwardly away from each other in the expanded state in evenly spaced relation. Accordingly, in the illustrated embodiment with the three legs, the legs 12a, 12b, and 12c are angularly displaced from each other by about 120-degrees. The angular displacement, a, between the legs 12 could vary depending on the number of legs provided and/or based upon the desired application. For example, the angular displacement a between the legs 12 could range from about 45-degrees (e.g., eight legs) to about 120-degrees (e.g., three legs), or may be provided with any angular displacement therebetween (e.g., 60-degrees for six legs, 90-degrees for four legs, etc.).

In exemplary embodiments, the legs 12 are operably coupled together with at least one hinge 36 to provide such rotational deployment of the legs 12 about the common axis 14. In the illustrated embodiment, only a single hinge 36 is provided having a pivot axis that corresponds with the common axis 14 between the legs 12. In other embodiments, more than one hinge may be provided, for example, a separate hinge connecting each adjacent leg 12 to one another. In such an embodiment with multiple hinges, each hinge may have a pivot axis about which the leg rotates, which may be offset from the common axis 14. However, in such multiple hinge embodiments, the legs 12 will still be considered to rotate in a direction about a common axis 14 that is between such multiple pivot axes, even if such rotation of the legs 12 about the common axis 14 is in a non-circular path.

Any suitable form of hinge that permits one leg to pivot relative to another leg may be utilized with the barricade 10. This includes, but is not limited to, butt hinges, integral knuckle hinges, continuous hinges, concealed hinges, spring hinges, living hinges, stop hinges, and the like. The at least one hinge 36 may be operably coupled to the top edge 16 or top portion, inside edge 20 or inside portion, or any other suitable portion of the respective legs 12, as would be understood by those having ordinary skill in the art. In the illustrated embodiment, for example, the hinge 36 is operably coupled at the top edge 16 of each leg 12. The hinge 36 may abut or may be formed at an outer surface of the leg 12 (e.g., protruding from one or more of the faces 26, 28 of the side portions 24), in which case some spacing may be provided between the corresponding faces 26, 28 of adjacent legs 12 when stacked together in the collapsed state. Preferably, however, the hinge 36 may be flush with or recessed from an outer surface of the leg (e.g., integral with the leg 12, or coupled within a recess 38 of the leg 12 as best shown in FIG. 8, for example). This will enable the corresponding faces 26, 28 of adjacent legs 12 to engage each other when in the collapsed state to further enhance the compactness of the design.

As discussed above, when the barricade 10 is in the expanded state, the respective outside edges 22 of the legs 12 are inclined at an acute inside angle Θ relative to the ground. In this manner, when in the expanded state, the outside edges 22 are disposed in a conical plane about the common axis 14 such that the barricade 10 is effectively similar to a cone. Also discussed above, the respective inside edges 20 of the legs 12 may be inclined relative to the ground to provide an internal space between the inside edges 20 of the legs 12. In this manner, the respective side portions 24 (bounded at least partially by the side edges 20, 22) extend in a longitudinal direction that is inclined upwardly relative to the ground an inwardly toward each other, such that the respective legs 12 all converge together to meet at the at least one hinge 36. As shown, the common axis 14 (e.g., hinge axis) is arranged vertically (e.g. perpendicularly) relative to the ground, and the respective faces 26, 28 of the legs 12 that rotate about the axis 14 also are disposed in corresponding vertical (e.g., perpendicular) planes relative to the ground. This enables the respective faces 26, 28 of the side portions 24 to face in an outward side direction when deployed to enhance the visible characteristics of the barricade 10.

In exemplary embodiments, the angle Θ at which the side portions 24 of the legs 12 are inclined relative to the ground may be depend on the angle at which the legs 12 are connected to the at least one hinge 36. For example, in the illustrated embodiment, the legs 12 are each connected to the hinge 36 at their respective top edges 16. Accordingly, the angle Φ of the top edge 16 relative to the outside edge 22 may determine the inclined angle Θ of the legs 12. If the top edge 16 has a greater angle Φ relative to the outside edge 22 (e.g., toward 90-degrees), then this will spread the legs 12 further apart for increasing the footprint and enhancing stability of the barricade 10, but will shorten the overall height of the barricade 10 thereby reducing its visible characteristic. Conversely, if the top edge 16 has a smaller angle Φ relative to the outside edge 22 (e.g., toward zero-degrees), then this will bring the legs 12 closer together, which will increase the height of the barricade 10 at the cost of reducing footprint and possibly stability.

The factors of height, footprint and/or stability of the barricade 10 may be balanced against each other to determine a suitable configuration. For example, depending on governmental traffic control regulations, the minimum overall height of the barricade 10 may need to be about 28-inches, and thus if the footprint of the base is made wider for more stability, then the length of the legs 12 may need to be made longer to maintain the minimum height requirement. In the illustrated embodiment, for example, the angle Φ between the top edge 16 and the outside edge 22 is about 30-degrees. Assuming each leg has a maximum length (L) of about 33-inches (about 84 cm), a maximum width (W) of about 5-inches (about 13 cm), and a maximum thickness (T) of 0.5 inches (about 1.3 cm), then the configuration as shown can provide a barricade 10 in the expanded state with an overall height, H, of about 29-inches (about 74 cm) (as measured from ground to apex); a maximum width, W2, of about 30-inches (about 76 cm) (as measured from outside bottom corner of one leg to outside bottom corner of adjacent leg), and a maximum footprint area, A, having a radius R of about 34-inches (about 86 cm) (as measured by the circle circumscribing the outside bottom corners of the legs, as shown in FIG. 6, for example). The angle Φ between the top edge 16 and the outside edge 22 could be in the range between 20-degrees and 60-degrees, such as 30-degrees, 45-degrees, or any number between such ranges to provide the desired configuration of the barricade. In some embodiments, the top edge 16 may be multi-faceted or multi-angled, such as with a chamfered portion (described below), to facilitate the changing of the angle while maintaining desired dimensions of the barricade 10.

In exemplary embodiments, the barricade 10 includes one or more suitable retainers (e.g., retaining structures or retaining devices) that are configured to retain the barricade 10 in the expanded state. For example, in the illustrated embodiment, the hinge 36 includes or is made from a flexible or resilient material, such as rubber (e.g., silicone rubber) or other elastomer, that is formed into a configuration in which the legs 12, when coupled to the hinge 36, are retained in the expanded state. More particularly, as best shown in FIG. 8, the hinge 36 may include a hollow hub portion 40 (i.e., knuckle) with three arms 42 (i.e., leaves) normally radiating from the hub portion 40 when in the expanded state. Each of the legs 12*a*, 12*b*, 12*c* is operably coupled to a respective one of the hinge arms 42, such as with suitable fastener(s) 44 (e.g., rivets or the like). As shown in FIG. 11, each of the hinge arms 42 is flexible to allow the barricade legs 12 to rotate about the common axis 14 (e.g., hinge axis) into the collapsed state where the legs 12 are stacked together. Also as shown, the hinge arms 42 are disposed within a recessed portion 38 of each leg 12. The respective recessed portions 38 may have a depth at least as deep as the thickness of each corresponding arm 42 disposed in the recess 38. This enables the hinge arms 42 to be recessed into or flush with the corresponding faces 26 of the legs 12, which enables the faces 26 and/or 28 to engage each other when in the collapsed state, thereby enhancing the compactness of the design. Referring back to FIG. 8, the resiliency provided by the hinge arms 42 normally biases the legs 12 back to their expanded positions at the different angular orientations. In this manner, the resilient material provided by the hinge 36 constitutes a retainer that is configured to normally maintain the legs 12 in their expanded positions. The resilient hinge 36 also constitutes a biasing member that can facilitate automatic deployment of the barricade to its expanded state. A restraint (e.g., band, strap, cord, or the like), or closure (e.g., clasp, clip, hook-and-loop fastener, or the like) could be provided with the legs 12 to maintain them in the collapsed state when being transported or stowed. Alternative forms of hinge(s), retainer(s), and/or biasing member(s) could be employed with the barricade 10, of which some of these alternatives are discussed in connection with the alternative embodiments described below.

Turning now to FIGS. 12-16, another exemplary embodiment of a portable barricade 110 is shown. The barricade 110 is substantially similar to the above-referenced barricade 10, and consequently the same reference numerals but indexed by 100 are used to denote structures corresponding to similar structures in the barricades 10, 110. In addition, the foregoing description of the barricade 10 is equally applicable to the barricade 110, except as noted below. Moreover, aspects of the barricades 10, 110 may be substituted for one another or used in conjunction with one another where applicable.

Similarly to the barricade 10, the barricade 110 includes at least three legs 112a, 112b, 112c that are operably coupled together to permit movement relative to each other between a collapsed state (not shown), and an expanded state (FIGS. 12 and 14-16). The barricade 110 is configured such that when in the collapsed state, the at least three legs (collectively referred to with reference number 112) are arranged with at least one of the legs 112c stacked between at least two others of the legs 112a, 112b to form a compact stack that facilitates the portability of the barricade. The at least three legs 112 are operably coupled together for rotation about a common axis 114, and when the barricade 110 is deployed to the expanded state, each leg 112 is rotated about the common axis 114 to spread the legs apart such that each leg 112 is arranged at a different angular position relative to the other legs, thereby enlarging the footprint and/or enhancing stability of the barricade 110.

In the illustrated embodiment, each leg 112 is formed with a generally quadrilateral shape (e.g., in the general form of a trapezoid), similarly to that of the barricade 10. As such, the legs 112 each have a top edge 116, a bottom edge 118, an inside edge 120, an outside edge 122, and a side portion 124 having opposite first and second faces 126, 128. The legs 112 of the barricade 110, however, are not formed with the hollow wave-formed panels; although the legs 112 could be so constructed. Likewise, the legs 112 are shown without footing 30, handles 35, or reflective material 34, although such features could be provided.

In the illustrated embodiment, the barricade 110 has a different hinge design than that of barricade 10. In particular, the hinge 136 of the barricade 110 is a knuckle-hinge pin design. As shown, the overall knuckle 150 of the hinge 136 is formed by offset hinge knuckle parts 152 that are operably coupled to each of the legs 112a, 112b, 112c at axially spaced apart locations. In exemplary embodiments, the hinge knuckle parts 152 may be integrally formed as portions of the respective legs 112 to form a unitary structure. This approach, however, may require each leg 112 to have a different configuration due to the different offset of the knuckle parts for each leg. As shown, a hinge pin 154 is disposed within the overall knuckle 150 formed by the offset knuckle parts 152 to permit the legs 112 to rotate about the common axis 114 provided by the hinge 136. Such a configuration may provide an easily collapsible and compact design, in that the configuration of the hinge 136 may permit corresponding faces 126, 128 of the legs to engage each other in the collapsed state. Such a knuckle-hinge pin design, however, may require the middle leg 112c to always be sandwiched between the other legs 112a, 112b when in the collapsed state, although other more reversible hinge designs could be used. In the illustrated embodiment, the hinge pin 154 is frangible, such as being made of a frangible plastic. The frangible hinge pin 154 is configured to break upon impact with the barricade 110, thus helping to prevent permanent damage to the hinge 136 and/or the legs 112. The frangible hinge pin 154 can easily be replaced and inserted into the hinge knuckle 150 to provide an easily rebuildable barricade 110.

Figure 13:
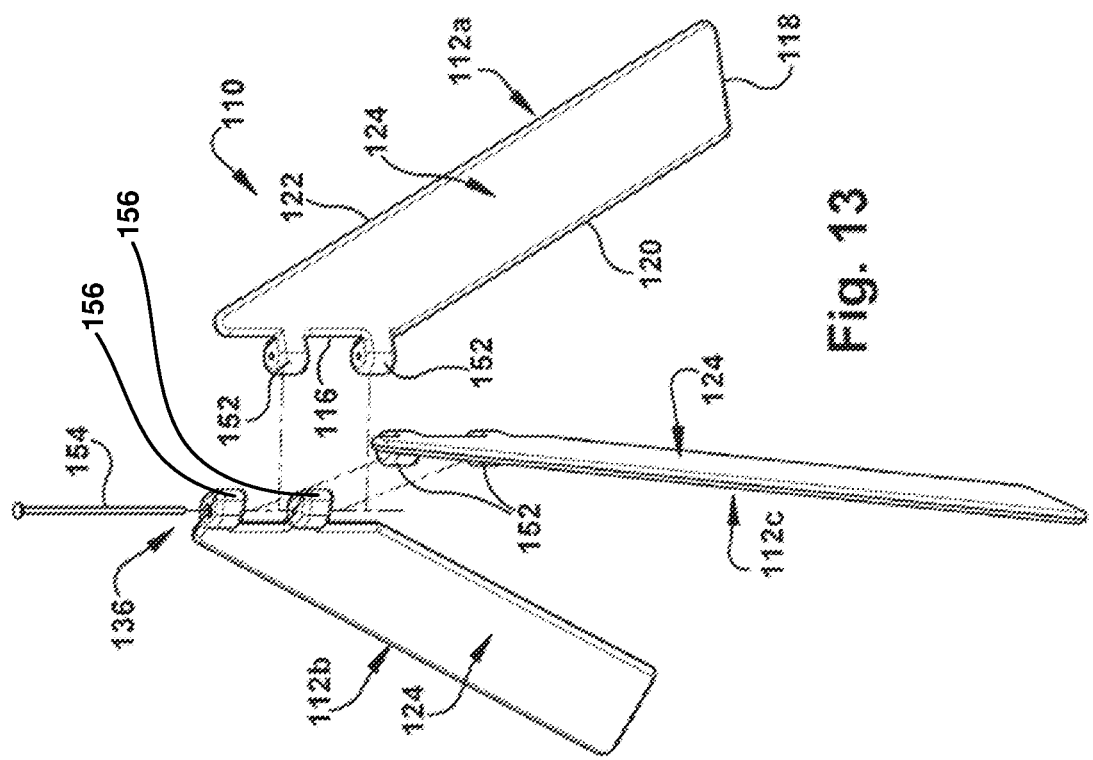
FIG. 13 is an exploded isometric view of the barricade in FIG. 12.
Figure 12:
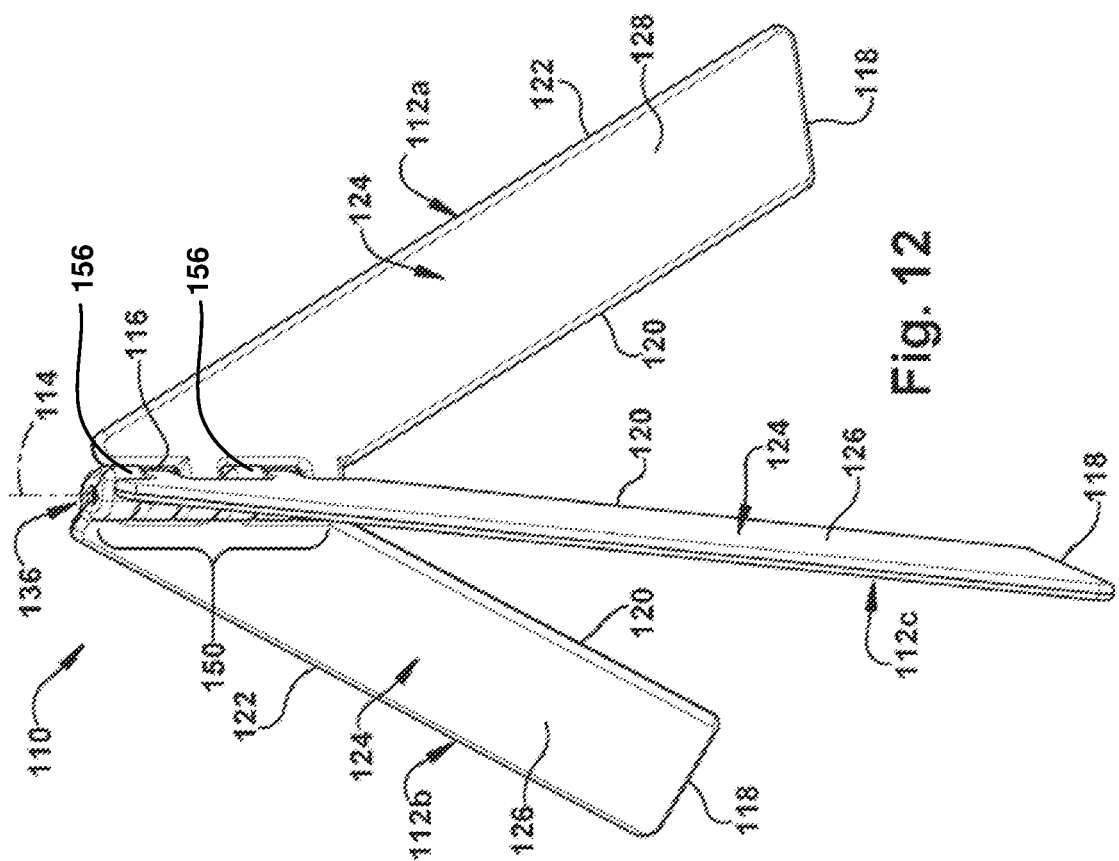
FIG. 12 is an isometric top, rear view of another exemplary portable barricade according to another embodiment of the present disclosure, in which the barricade is shown in an exemplary expanded state.
Figure 14:
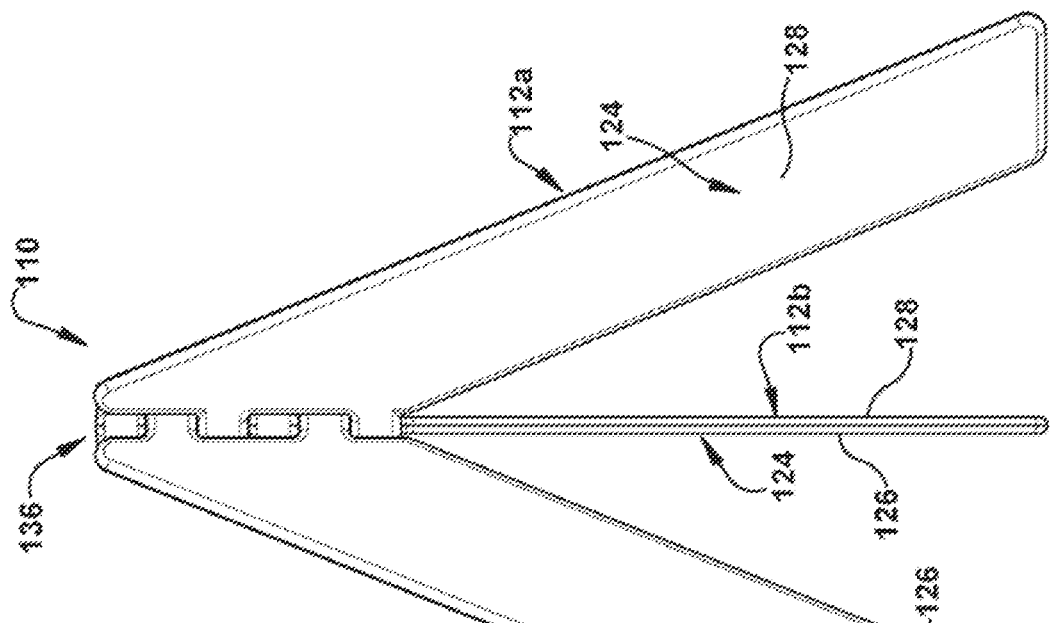
FIG. 14 is a side view of the barricade in FIG. 12 shown in the expanded state.
Figure 15:
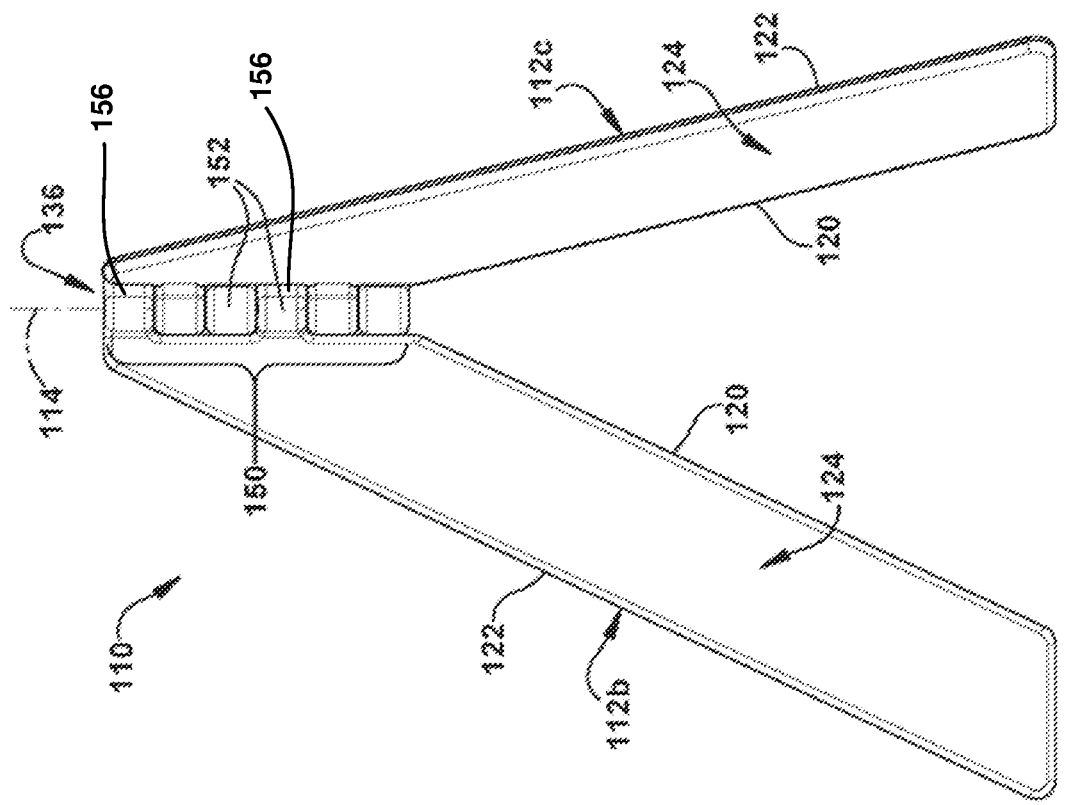
FIG. 15 is a front view of the barricade in FIG. 12 shown in the expanded state.
Figure 16:
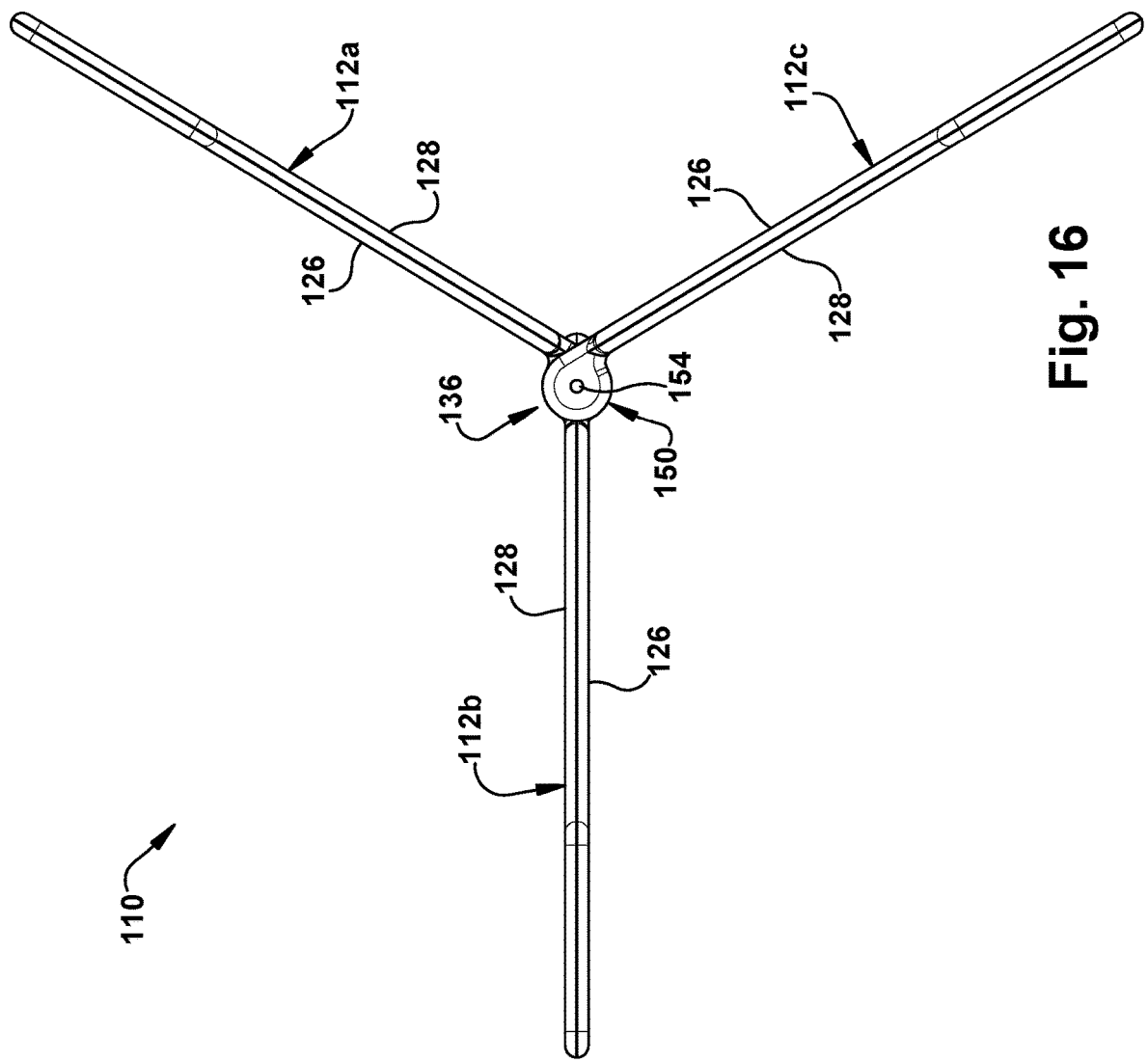
FIG. 16 is a bottom view of the barricade in FIG. 12 shown in the expanded state.
Figure 17:
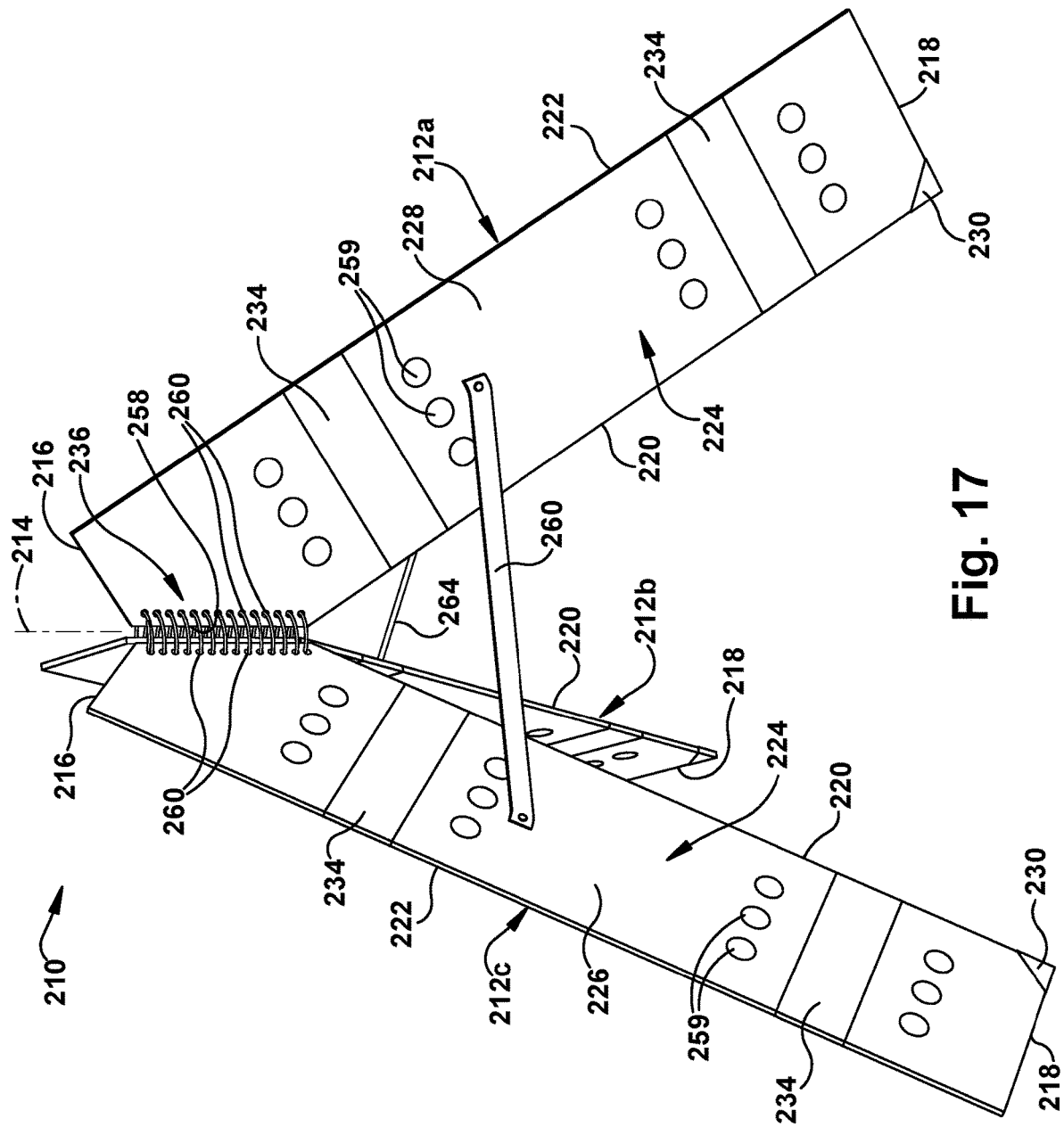
FIG. 17 is an isometric top, side view of another exemplary portable barricade according to another embodiment of the present disclosure, in which the barricade is shown in an exemplary expanded state.

In exemplary embodiments, the barricade 110 may include one or more suitable retainers (e.g., retaining structures or retaining devices) that are configured to retain the barricade 110 in the expanded state. For example, the hinge 136 or other parts of the barricade 110 may include one or more detents or stops 156 to restrict rotation of the legs 112 beyond a certain point when deployed. As an example, a typical stop hinge design may be employed for the hinge 136. The detents or stops 156 may retain the legs 112 at the expanded position, such as by restricting further rotation of the legs 112 and/or due to the weight of the structure tending to bias the legs 112 against the detents or stops 156. For example, as shown in FIG. 13, the detents or stops 156 can extend from one or more offset hinge knuckle parts 152. Alternatively or additionally, a biasing member such as a spring may be provided to bias the barricade 110 into the expanded position. The spring may be provided in cooperation with the hinge 136 (e.g., a spring hinge) and/or may otherwise bias the legs 112.

Turning to FIGS. 17-24, another exemplary embodiment of a portable barricade 210 is shown. The barricade 210 is substantially similar to the above-referenced barricades 10, 110 and consequently the same reference numerals but in the 200-series are used to denote structures corresponding to similar structures in the barricades 10, 110, 210. In addition, the foregoing description of the barricade 10, 110 is equally applicable to the barricade 210, except as noted below. Moreover, aspects of the barricades 10, 110, 210 may be substituted for one another or used in conjunction with one another where applicable.

Similarly to the barricades 10 and 110, the barricade 210 includes at least three legs 212a, 212b, 212c that are operably coupled together to permit movement relative to each other between a collapsed state (FIGS. 22-24), and an expanded state (FIGS. 17-20). The barricade 210 is configured such that when in the collapsed state, the at least three legs (collectively referred to with reference number 212) are arranged with at least one of the legs 212c stacked between at least two others of the legs 212a, 212b to form a compact stack that facilitates the portability of the barricade. The at least three legs 212 are operably coupled together for rotation about a common axis 214, and when the barricade 210 is deployed to the expanded state, each leg 212 is rotated about the common axis 214 to spread the legs apart such that each leg 212 is arranged at a different angular position relative to the other legs, thereby enlarging the footprint and/or enhancing stability of the barricade 210.

As shown, each leg 212 has a top edge 216, a bottom edge 218, an inside edge 220, an outside edge 222, and a side portion 224 having opposite first and second faces 226, 228. In the illustrated embodiment, each leg 212 is formed identical to each other in a generally rectangular shape, with each leg having a chamfered corner 258 between the top edge 216 and inside edge 220. As shown, the barricade 210 may include reflective material 234 on each leg 212. Also as shown, the side portions 224 of the legs 212 may include one or more through-holes 259 that allow wind to pass therethrough to minimize wind resistance and enhance stability of the barricade structure.

In the illustrated embodiment, a hinge 236 is operably coupled at the chamfered corner 258 of each leg 212. As described above, the angle of the chamfered corner 258 at which the hinge 236 is coupled may determine the inclined angle of the legs 212 relative to the ground. In the illustrated embodiment, for example, the chamfered corner 258 is at an angle of about 45-degrees relative to the outside edge 222. In the illustrated embodiment, the hinge 236 is configured as a spiral hinge, in which the spiral coil of the hinge 236 extends through openings 260 in the legs, such that the legs 212 are rotatable about the spiral coil between the collapsed and expanded states. Any suitable form of hinge may be utilized with the barricade 210 instead of the coil hinge. Also as shown in the illustrated embodiment, when in the expanded state the respective squared bottom edges 218 of the legs 212 are inclined relative to the ground to provide spacing with an outer portion of the bottom edge 218. While such a design may reduce surface area and possibly grip, it also may permit water or wind to more easily flow around the bottom edge 218.

In exemplary embodiments, the barricade 210 may include one or more suitable retainers (e.g., retaining structures or devices) that are configured to retain the barricade 210 in the expanded state. For example, the barricade 210 may include one or more connectors 260, 262, 264 that connect the legs 212 together at locations distal the hinge 236. As shown in the illustrated embodiment, for example, a first connecting strap 260 connects the first barricade leg 212a to the third barricade leg 212c, and a second connecting strap 262 connects the second barricade leg 212b to the third barricade leg 212c. In addition, a third connecting band 264 connects the first barricade leg 212a to the second barricade leg 212b. The connecting straps 260, 262 and/or band 264 may be connected to the respective legs 212 via suitable fasteners 266, such as a rivets, bolts, screws or the like. Any suitable connector(s) that permit the legs 212 to move relative to each other and retain the legs 212 at their expanded position can be used with the barricade 210, including but not limited to straps, cords, ribbons, wires, or the like.

In the illustrated embodiment, the connecting straps 260, 262 are formed as flexible, non-elastic restraints, such as woven or webbed cloth, which permits the legs 212 to spread away from each other to a certain point but then restrains the legs 212 from further movement beyond the attached length of the straps 260, 262. The connecting band 264, on the other hand, may be formed as an elastic band, such as a rubber band or bungy cord, which provides tension when the first and second legs 212a, 212b are spread away from each other beyond a certain point. The non-elastic connecting straps 260, 262 and elastic connecting band 264 cooperate with each other to place the barricade structure in a state of tension that retains the legs 212 in the expanded state until acted upon by an external force, such as by a user who intentionally collapses the barricade 210.

Figure 20:
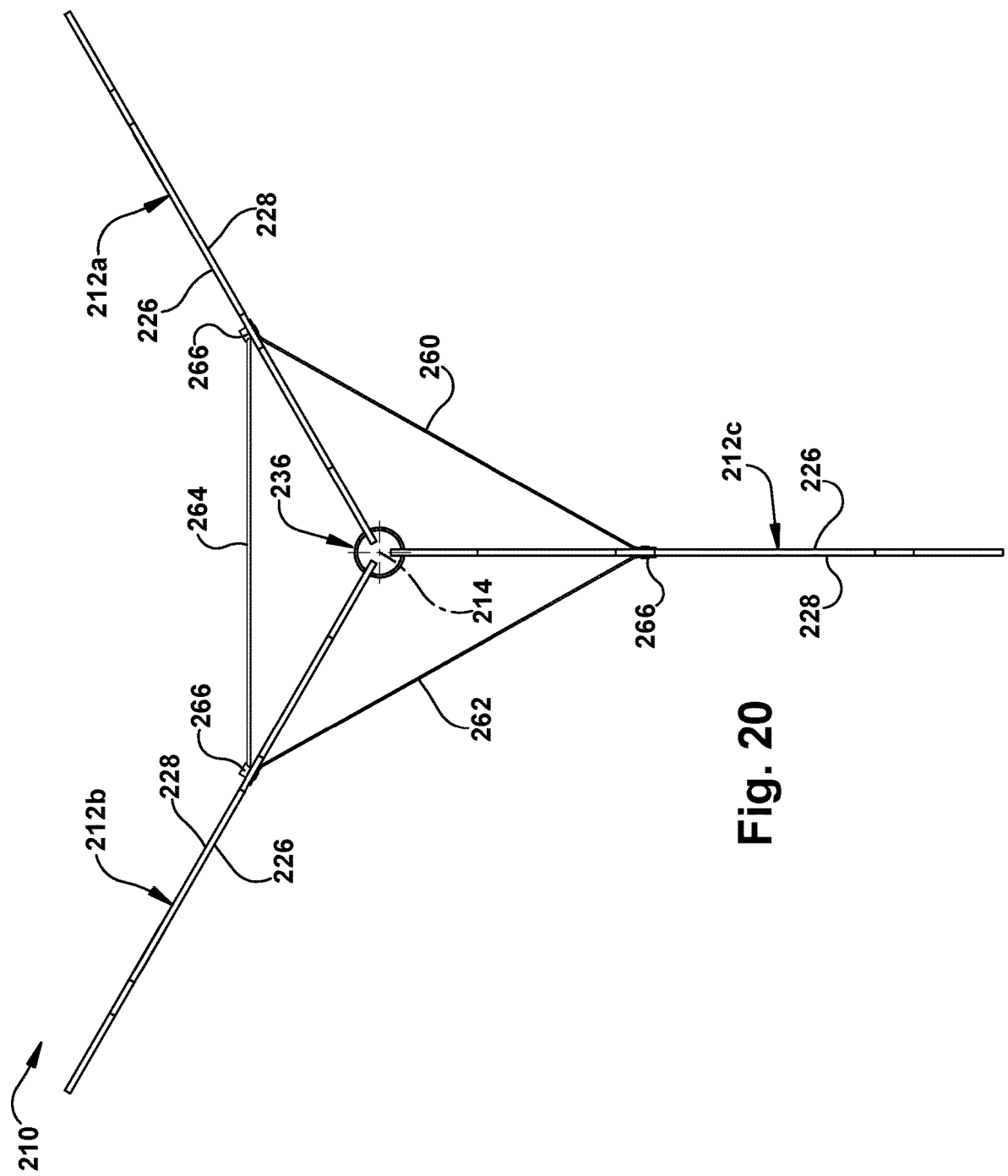
FIG. 20 is a top view of the barricade in FIG. 17 shown in the expanded state.
Figure 22:
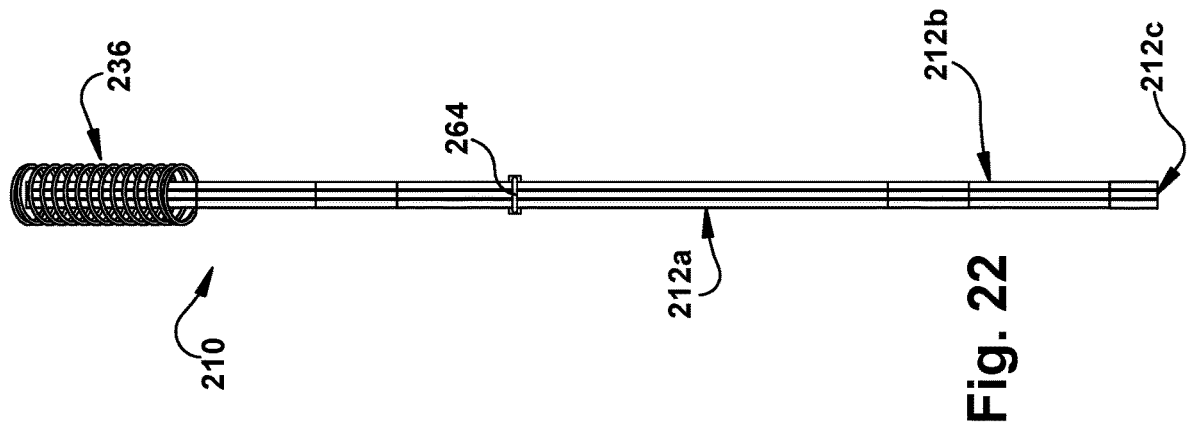
FIG. 22 is a front view of the barricade in FIG. 17 shown in an exemplary fully collapsed state.
Figure 21:
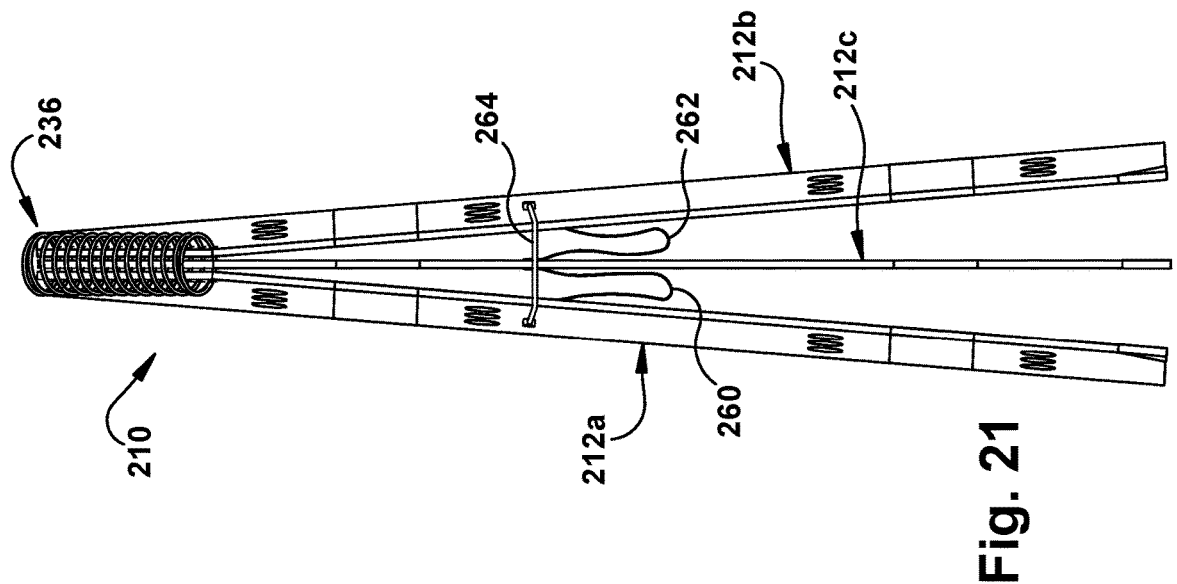
FIG. 21 is a front view of the barricade in FIG. 17 shown in a partially collapsed state.
Figure 24:
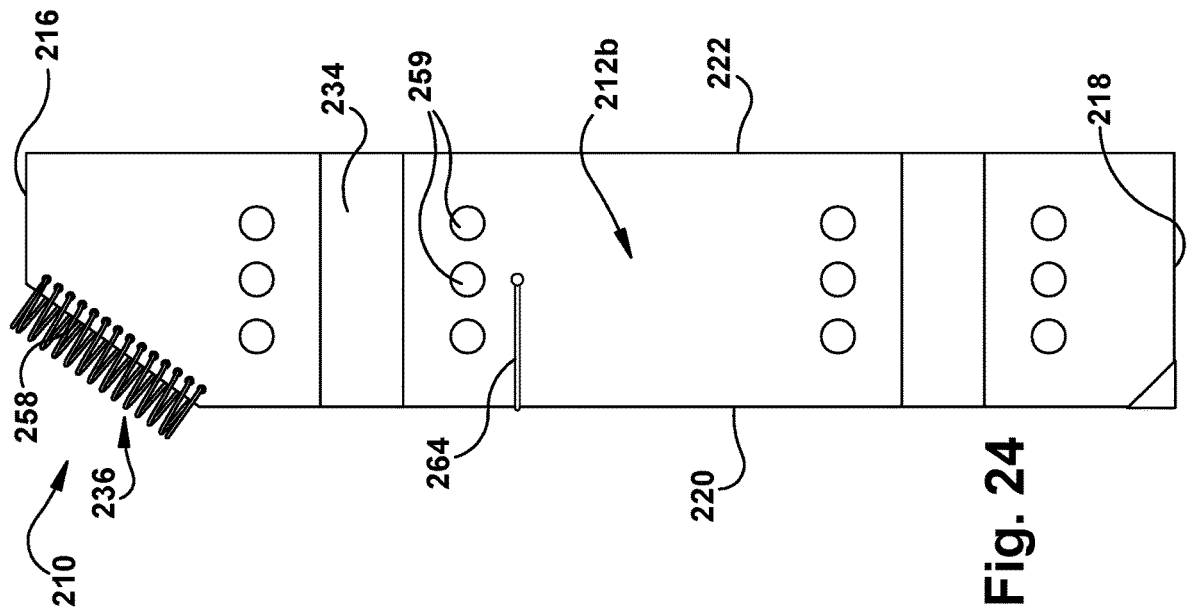
FIG. 24 is a side view of the barricade in FIG. 22 shown in the collapsed state.
Figure 23:
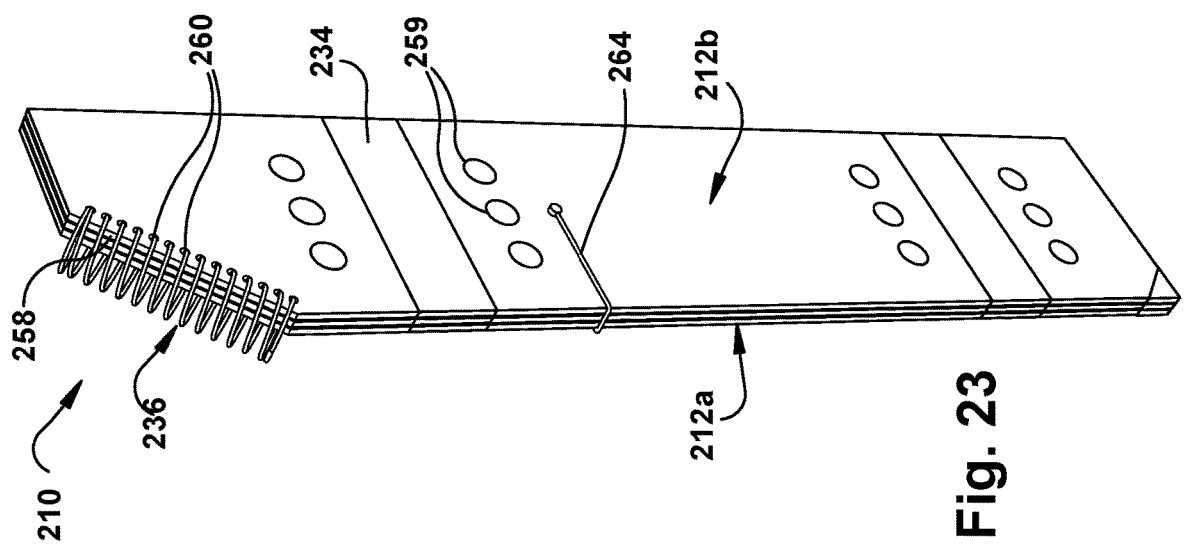
FIG. 23 is an isometric top, side view of the barricade in FIG. 22 shown in the collapsed state.

More specifically, as best shown in FIG. 20, the connecting straps 260, 262 prevent expansion or movement beyond their attached length and thus hold the connected first barricade leg 212a and third barricade leg 212c at a maximum distance apart equal to the attached length of the connecting straps 260, 262. Elastic band 264 urges first and second barricade legs 212a, 212b together, however they will only spread as far as the connecting straps 260, 262 allow. In combination then, once expanded, elastic band 264 keeps the portable barricade 210 expanded and tensioned to remain expanded and to resist collapsing. However, once the first and second barricade legs 212a, 212b are collapsed back toward each other, the tension in elastic band 264 is released, thereby permitting the legs 212 to be stacked together in the compact and storable collapsed state.

Exemplary portable barricades 10, 110, 210 have been described herein. The portable barricade 10, 110, 210 includes at least three legs 12, 112, 212 that that are operably coupled together to permit movement relative to each other between a collapsed state and an expanded state. The barricade 10, 110, 210 is configured such that when in the collapsed state, the at least three legs 12, 112, 212 are arranged with at least one of the legs stacked between at least two other legs to form a compact stack that facilitates portability of the barricade. The at least three legs 12, 112, 212 are operably coupled together for rotation about a common axis 14, 114, 214. When the barricade is deployed to the expanded state, each leg 12, 112, 212 is rotated about the common axis 14, 114, 214 to spread the legs apart such that each leg is arranged at a different angular position about the axis relative to the other legs, thereby enlarging the footprint and/or enhancing stability of the barricade.

In exemplary embodiments, the legs 12, 112, 212 may be formed as flat panels having a top edge 16, 116, 216; a bottom edge 18, 118, 218; opposing (first and second) side edges 20, 120, 220 and 22, 122, 222 that extend in a longitudinal direction between the top and bottom edges; and a side portion 24, 124, 224 having opposing faces 26, 126, 226 and 28, 128, 228 that extend between the top, bottom, side edges. More than three legs may be provided. The legs also could take different shapes or forms such as triangular, irregular, round, tapered or the like, which such different shapes may have corresponding tops, bottoms and sides. The legs may be made of any suitable material or combination of materials, and preferably is made predominantly of plastic.

In exemplary embodiments, when in the collapsed state, the respective side portions 24, 124, 224 of the legs may be stacked adjacently to one another such that the side portion of one leg is sandwiched between the side portions of at least two other legs. In exemplary embodiments, the side portion may have opposing flat faces that are configured to mate with each other along the length of the leg when in the collapsed state to enhance compactness of the design.

In exemplary embodiments, the legs 12, 112, 212 are hinged together via at least one hinge 36, 136, 236 to permit deployment to the expanded state, in which each leg is rotated about the common axis 14, 114, 214 and arranged at a different angular position than the other legs. The barricade 10, 110, 210 also may include one or more retaining structures 36, 260, 262, 264 that are configured to retain the barricade in the expanded state. Alternatively or additionally, the barricade may include one or more biasing members 36 that are configured to bias the barricade to the expanded state.

According to an aspect of the present disclosure a barricade includes: a plurality of legs, wherein the plurality of legs can be collapsed together; and wherein the plurality of legs can be expanded away from each other.

According to another aspect of the present disclosure, a portable barricade includes: at least three legs configured for placement on the ground, the at least three legs being operably coupled together to permit movement relative to each other between a collapsed state and an expanded state, wherein the barricade is configured such that: when in the collapsed state, the at least three legs are arranged with at least one of the legs stacked between at least two others of the legs to form a compact stack that facilitates portability of the barricade; and when in the expanded state, the at least three legs are deployed such that respective portions of the at least three legs are spread outwardly away from each other to enlarge the footprint of the barricade when placed on the ground.

According to another aspect of the present disclosure, a portable barricade for placement on the ground, includes: at least three legs, each leg having a top portion, a bottom portion, and a side portion that extends between the top portion and the bottom portion; at least one hinge that hingedly couples the at least three legs together for permitting movement of the legs relative to each other about a common axis between a collapsed state and an expanded state; where in the collapsed state the barricade is configured such that the at least three legs are stacked adjacently to one another to form a compact stack for facilitating portability;

and where in the expanded state the barricade is configured such that each of the three legs is rotated about the common axis such that each leg is arranged at a different angular position about the common axis relative to each other leg.

Embodiment(s) according to the present disclosure may include one or more features of the foregoing aspects, separately or in any combination, which may be combined with one or more of the following additional features, which may be included separately or in any combination.

In some embodiments, the at least three legs are operably coupled together for rotation about a common axis.

In some embodiments, when in the expanded state, each of the at least three legs is arranged at a different angular position about the common axis.

In some embodiments, the common axis is inclined relative to the ground when the barricade is placed on the ground.

In some embodiments, the common axis is perpendicular to the ground.

In some embodiments, each of the three legs is formed as an elongated panel have a top portion, a bottom portion, opposite first and second side edges extending between the top portion and the bottom portion, and a side portion extending between the top portion, the bottom portion, and the first and second side edges.

In some embodiments, when in the collapsed state, the respective side portions of the legs are stacked adjacently to one another in parallel relation, such that the side portion of at least one of the legs is sandwiched between the side portions of at least two of the other legs, and such that the side portions of the legs engage with each other.

In some embodiments, when in the collapsed state, the corresponding top, bottom, and first and second side edges of the legs align with each other.

In some embodiments, when in the collapsed state, an overall length of the barricade is greater than an overall width of the barricade, and the overall width of the barricade is greater than an overall thickness of the barricade.

In some embodiments, when in the expanded state and placed on the ground, respective outside edges of the legs are inclined to a plane that is perpendicular to the ground.

In some embodiments, when in the expanded state, the respective outside edges of the legs are disposed in a conical plane about a common axis of rotation of the legs.

In some embodiments, when in the expanded state and placed on the ground, the respective side portions of the legs are disposed in respective planes that are perpendicular to the ground.

In some embodiments, the at least three legs are operably coupled together by at least one hinge, the at least one hinge having a rotation axis that is vertical relative to the ground when the barricade is placed on the ground.

In some embodiments, when in the expanded state and placed on the ground, the respective side portions of the legs extend in a longitudinal direction that is inclined upwardly relative to the ground an inwardly toward each other, such that the respective legs converge together to meet at one or more hinges.

In some embodiments, the barricade further includes at least one retainer that is configured to retain the barricade in the expanded state.

In some embodiments, the at least one retainer includes at least one hinge, the at least one hinge including a resilient material that normally retains the barricade in the expanded state.

In some embodiments, the at least one retainer includes detents or stops.

In some embodiments, each of the at least three legs is identical.

In some embodiments, each of the legs includes an outside edge extending between the top portion and the bottom portion, and wherein, when in the expanded state and placed on the ground, the respective outside edges of the legs are inclined to a plane that is perpendicular to the ground.

According to another aspect of the present disclosure, a kit or combination includes: a plurality of the portable barriers according to any of the preceding aspect(s) and/or embodiment(s), and a container (e.g., bag or box), or a holder (e.g., strap, cord, etc.) or fastener, for carrying the plurality of portable barriers.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An operable connection or coupling may include the entities being integral and unitary with each other.

Terms such as "top," "bottom," "upper," "lower," "left," "right," "front," "rear," "forward," "rearward," and the like as used herein may refer to an arbitrary frame of reference, rather than to the ordinary gravitational frame of reference. The terms "inside edge" and "outside edge" relate to the position of the edges of the barricade legs when the portable barricade apparatus 10 is in the expanded position, as shown in FIG. 1, for example.

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A portable traffic control device, comprising:
at least three legs configured for placement on the ground,
the at least three legs being operably coupled together to permit movement relative to each other between a collapsed state and an expanded state, wherein the traffic control device is configured such that:
when in the collapsed state, the at least three legs are arranged with at least one of the legs stacked between at least two others of the legs to form a compact stack that facilitates portability;
when in the expanded state, the at least three legs are deployed such that respective portions of the at least three legs are spread outwardly away from each other to enlarge a footprint of the traffic control device; and
an elastic retaining structure coupled to at least two of the legs, wherein the elastic retaining structure is configured such that:
when the at least three legs are in the expanded state, the elastic retaining structure keeps the at least three legs spread outwardly away from each other and resists movement of the at least three legs toward the collapsed state; and
when the at least three legs are in the collapsed state, the elastic retaining structure retains the at least three legs in the form of the compact stack until acted upon by an external force;
wherein moving the at least three legs between the collapsed state and the expanded state increases tension in the elastic retaining structure.

2. The portable traffic control device according to claim 1,
wherein the at least three legs are operably coupled together for rotation about a common axis; and
wherein, when in the expanded state, each leg of the at least three legs is arranged at a different angular position about the common axis.

3. The portable traffic control device according to claim 1, wherein, when the at least three legs are in the collapsed state, an overall length of the traffic control device is greater than an overall width of the traffic control device, and the overall width of the traffic control device is greater than an overall thickness of the traffic control device.

4. The portable traffic control device according to claim 1, wherein, the at least three legs are operably coupled together by at least one hinge, the at least one hinge having a rotation axis that is vertical relative to the ground when the traffic control device is placed on the ground.

5. The portable traffic control device according to claim 1, wherein the elastic retaining structure is configured to retain the at least three legs in the expanded state.

6. The portable traffic control device according to claim 1, wherein when the at least three legs are in the collapsed state, the elastic retaining structure is coupled to a first leg and a second leg of the at least three legs and at least one leg of the at least three legs is stacked between the first leg and the second leg to form the compact stack.

7. The portable traffic control device according to claim 1, wherein each of the at least three legs is identical.

8. A kit including:
a plurality of the portable traffic control devices according to claim 1, and
a container for carrying the plurality of portable traffic control devices.

9. The portable traffic control device according to claim 1, wherein each of the legs have an inside edge and an outside edge that are generally parallel to one another.

10. The portable traffic control device according to claim 1,
wherein each of the three legs is formed as an elongated panel have a top portion, a bottom portion, opposite first and second side edges extending between the top portion and the bottom portion, and a side portion extending between the top portion, the bottom portion, and the first and second side edges.

11. The portable traffic control device according to claim 10, wherein, when the at least three legs are in the collapsed state, the respective side portions of the legs are stacked adjacently to one another in parallel relation, such that the side portion of at least one of the legs is sandwiched between the side portions of at least two of the other legs, and such that the side portions of the legs engage with each other.

12. The portable traffic control device according to claim 10, wherein, when the at least three legs are in the collapsed state, the corresponding top, bottom, and first and second side edges of the legs align with each other.

13. The portable traffic control device according to claim 10, wherein, when the at least three legs are in the expanded state and placed on the ground, the respective side portions of the legs are disposed in respective planes that are perpendicular to the ground.

14. The portable traffic control device according to claim 10, wherein, when the at least three legs are in the expanded state and placed on the ground, the respective side portions of the legs extend in a longitudinal direction that is inclined upwardly relative to the ground and inwardly toward each other, such that the respective legs converge together to meet at one or more hinges.

15. The portable traffic control device according to claim 1, wherein, when the at least three legs are in the expanded state and placed on the ground, respective outside edges of the legs are inclined to a plane that is perpendicular to the ground.

16. The portable traffic control device according to claim 15, wherein, when the at least three legs are in the expanded state, the respective outside edges of the legs are disposed in a conical plane about a common axis of rotation of the legs.

17. A portable traffic control device, comprising:
at least three legs configured for placement on the ground,
a hinge rotatably connecting the at least three legs to permit rotation of the at least three legs relative to each other between a collapsed state and an expanded state; and
an elastic retaining structure connected to a first leg of the at least three legs and second leg of the at least three legs, wherein:
when the at least three legs are in the collapsed state:
the at least three legs are arranged with at least one leg of the at least three legs stacked between the first leg and the second leg to form a compact stack that facilitates portability,
when the at least three legs are in the expanded state:
the at least three legs are deployed such that the at least three legs are spread radially away from the hinge to enlarge the footprint of the at least three legs when placed on the ground to control a flow of traffic, and wherein the elastic retaining structure urges the at least three legs toward at least one of the expanded state and the collapsed state, the elastic retaining structure resisting movement of the at least three legs between the expanded state and the collapsed state.

18. A portable traffic control device, comprising:

at least three legs configured for placement on the ground, the at least three legs being operably coupled together to permit movement relative to each other between a collapsed state and an expanded state; and an elastic retaining structure coupled to at least two of the legs such that moving the at least three legs between the collapsed state and the expanded state increases tension in the elastic retaining structure, wherein the at least three legs and the elastic retraining structure are configured such that the elastic retaining structure resists movement of the at least three legs between the collapsed state and the expanded state, wherein when in the collapsed state, the at least three legs are arranged with at least one of the legs stacked between at least two others of the legs to form a compact stack that facilitates portability, and the elastic retaining structure keeps the at least three legs in the compact stack and resists movement of the at least three legs toward the expanded state, and when in the expanded state, the at least three legs are deployed such that respective ground-engaging portions of the at least three legs are spread outwardly away from each other, and the elastic retaining structure keeps the at least three legs spread outwardly away from each other and resists movement of the at least three legs toward the collapsed state.

* * * * *